United States Patent
Suzuki et al.

(10) Patent No.: US 7,570,254 B2
(45) Date of Patent: Aug. 4, 2009

(54) HAPTIC FEEDBACK CONTROLLER, METHOD OF CONTROLLING THE SAME, AND METHOD OF TRANSMITTING MESSAGES THAT USES A HAPTIC FEEDBACK CONTROLLER

(75) Inventors: Takahiko Suzuki, 308, Shiju-Nakamura C-2, 5321 Osachi, Okaya-shi, Nagano (JP) 3940011; Takeshi Kodaira, Nagano (JP)

(73) Assignee: Takahiko Suzuki, Nagano (JP)

( * ) Notice: Subject to any disclaimer, the term of this patent is extended or adjusted under 35 U.S.C. 154(b) by 116 days.

(21) Appl. No.: 10/541,610

(22) PCT Filed: Nov. 9, 2004

(86) PCT No.: PCT/JP2004/016611

§ 371 (c)(1),
(2), (4) Date: Jul. 7, 2005

(87) PCT Pub. No.: WO2006/051581

PCT Pub. Date: May 18, 2006

(65) Prior Publication Data

US 2006/0255683 A1 Nov. 16, 2006

(51) Int. Cl.
*G06F 3/033* (2006.01)
*G09G 5/00* (2006.01)
(52) U.S. Cl. .................. 345/184; 345/156; 345/157
(58) Field of Classification Search .............. 715/701, 715/702; 345/156–184
See application file for complete search history.

(56) References Cited

U.S. PATENT DOCUMENTS

| | | | |
|---|---|---|---|
| 4,622,483 A | | 11/1986 | Staufenberg, Jr. et al. |
| 4,893,045 A | * | 1/1990 | Honda ................ 310/323.14 |
| 6,066,225 A | * | 5/2000 | Lopes .................... 156/245 |
| 6,091,179 A | | 7/2000 | Tobe et al. |
| 6,154,201 A | | 11/2000 | Levin et al. |
| 6,211,861 B1 | * | 4/2001 | Rosenberg et al. ........ 345/163 |
| 6,525,711 B1 | * | 2/2003 | Shaw et al. ............... 345/156 |
| 6,636,197 B1 | * | 10/2003 | Goldenberg et al. ....... 345/156 |
| 6,686,911 B1 | | 2/2004 | Levin et al. |
| 6,703,550 B2 | * | 3/2004 | Chu ........................ 84/609 |
| 6,707,443 B2 | * | 3/2004 | Bruneau et al. ........... 345/156 |
| 6,894,422 B2 | | 5/2005 | Kato |
| 7,038,667 B1 | * | 5/2006 | Vassallo et al. ........... 345/184 |

(Continued)

FOREIGN PATENT DOCUMENTS

JP 62-210519 9/1987

(Continued)

OTHER PUBLICATIONS

Gordon Cook, "An Introduction to Piezoelectric Motors", Sensors Magazine, Dec. 1, 2001, pp. 1-7 as captured for reference from http://www.sensorsmag.com/sensors/content/printContentPopup.jsp?id=361287 on Jun. 2, 2008.*

*Primary Examiner*—Amare Mengistu
*Assistant Examiner*—Robert R Rainey
(74) *Attorney, Agent, or Firm*—Lowe Hauptman Ham & Berner, LLP

(57) ABSTRACT

A haptic feedback controller that controls a controlled appliance includes a base, a cap, a piezoelectric motor, a rotation control device, and a rotational state detecting device.

23 Claims, 16 Drawing Sheets

U.S. PATENT DOCUMENTS

2003/0201975 A1* 10/2003 Bailey et al. ................ 345/161
2004/0032395 A1   2/2004 Goldenberg et al.

FOREIGN PATENT DOCUMENTS

| | | |
|---|---|---|
| JP | 2-027418 | 1/1990 |
| JP | 3-029146 | 2/1991 |
| JP | 6-131744 | 5/1994 |
| JP | 2000-245173 A | 9/2000 |
| JP | 2001-125722 | 5/2001 |
| JP | 3 086718 U | 4/2002 |
| JP | 2002-251243 | 9/2002 |
| JP | 2003-288173 | 10/2003 |
| JP | 2004-259171 | 9/2004 |

* cited by examiner

HAPTIC FEEDBACK CONTROLLER, METHOD OF CONTROLLING THE SAME, AND METHOD OF TRANSMITTING MESSAGES THAT USES A HAPTIC FEEDBACK CONTROLLER

RELATED APPLICATIONS

The present application is based on, and claims priority from International Application No. PCT/JP2004/16611 filed Nov. 9, 2004, the disclosure of which is hereby incorporated by reference herein in its entirety.

TECHNICAL FIELD

The present invention relates to a haptic feedback controller, a method of controlling the same, and a method of transmitting messages that uses a haptic feedback controller.

BACKGROUND ART

FIG. 20 is a series of diagrams useful in explaining a conventional haptic feedback controller 1100. FIG. 20(A) is a perspective view showing the haptic feedback controller 1100 and FIG. 20(B) is an exploded perspective view showing the haptic feedback controller 1100. FIG. 21 is a diagram showing a control panel 1150 equipped with the haptic feedback controller 1100. FIG. 22 is a block diagram of the control panel 1150.

As shown in FIG. 20B, the haptic feedback controller 1100 includes a DC motor 1108 and a knob 1102 that is coupled to a rotating shaft of the DC motor 1108. The DC motor 1108 is disposed in an internal space enclosed by a top case 1104 and a bottom case 1106 of the haptic feedback controller 1100. As shown in FIG. 21, the knob 1102 is rotatable on the control panel 1150 in a rotational direction (the "$D_1$ direction" and the opposite direction) of the DC motor 1108.

It should be noted that the knob 1102 is constructed so as to be capable of being pushed back in eight directions (the "$D_2$ directions") on a horizontal plane. The knob 1102 can also be constructed so as to be capable of being pushed and pulled in a perpendicular direction (the "$D_3$ direction" and the opposite direction) along the rotating axis 1108ax of the DC motor 1108.

As shown in FIG. 22, in the haptic feedback controller 1100, a sensor 1112 detects a rotational state of the knob 1102 using an encoder disk 1110 (see FIG. 20B) and outputs the detection result to a local microprocessor 1116 as information relating to the rotational state of the knob 1102. In accordance with the information relating to the rotational state of the knob 1102, the local microprocessor 1116 outputs information for controlling rotation of the DC motor 1108 to an actuator interface 1118 for controlling rotation of the DC motor 1108. By doing so, with the haptic feedback controller 1100, it is possible to provide a user who operates the knob 1102 with haptic feedback (see Patent Document 1, for example).

However, DC motors are normally characterized by not producing a large torque during low-speed rotation. This means that with the haptic feedback controller 1100 where the rotating shaft of the knob 1102 is directly coupled to the DC motor 1108, during low-speed rotation of the knob 1102, it is not possible to provide sufficiently large haptic feedback to the knob 1102. As a result, the haptic feedback controller 1100 has had the problem of a loss in the ability to express haptic feedback.

For this reason, another conventional haptic feedback controller that can solve the above problem has been proposed.

FIG. 23 is a series of diagrams useful in explaining this other conventional haptic feedback controller 1200. FIG. 23(A) is a perspective view of the haptic feedback controller 1200 and FIG. 23(B) is an exploded perspective view of the haptic feedback controller 1200.

As shown in FIG. 23B, in the haptic feedback controller 1200, a knob 1202 is coupled to a DC motor 1208 via a belt transmission mechanism (pulleys 1210, 1214 and a belt 1212). This means that even when the knob 1202 rotates at low speed, the DC motor 1208 is still capable of rotating at quite high speed, so that in the haptic feedback controller 1200 it is possible to provide sufficiently large haptic feedback to the knob 1202 even during low-speed rotation of the knob 1202 (see Patent Document 1, for example).

[Patent Document 1] Japanese Registered Utility Model No. 3,086,718

DISCLOSURE OF THE INVENTION

Problem to be Solved by the Present Invention

However, in the haptic feedback controller 1200, since a belt transmission mechanism with large backlash is present between the knob 1202 and the DC motor 1208, there has been the problem that there is inevitably a loss in the ability to express haptic feedback. This means that there has been the problem that it has not been possible to provide a haptic feedback controller able to express a wide variety of haptic feedback.

For this reason, the present invention was conceived to solve the problem described above, and it is an object of the present invention to provide a haptic feedback controller able to express a wide variety of haptic feedback and a method of controlling a haptic feedback controller that can be favorably used with this haptic feedback controller. It is a further object of the present invention to provide a method of transmitting messages using a haptic feedback controller.

Means for Solving the Problem (1) A haptic feedback controller according to the present invention is a haptic feedback controller for controlling a controlled appliance and includes: a base; a cap that is rotatable with respect to the base; a piezoelectric motor including a ring-shaped stator that is fixed to the base and a ring-shaped rotor that is fixed to the cap; a rotation control device for controlling a rotational state of the piezoelectric motor; and a rotational state detecting device for detecting the rotational state of the cap with respect to the base or the rotational state of the piezoelectric motor.

For this reason, according to the haptic feedback controller of the present invention, a piezoelectric motor that produces a large torque even when rotating at low speed is used as the driving source for producing haptic feedback, so that sufficiently large haptic feedback can be applied to the cap even when the cap is rotated at low speed. Also, since the base and the cap are respectively fixed to the stator and the rotor of the piezoelectric motor, there is no backlash.

As a result, according to the haptic feedback controller of the present invention, the object of the present invention is achieved, that is, it is possible to provide a haptic feedback controller for which there is no loss in the ability to express haptic feedback and which can express a wide variety of haptic feedback.

The piezoelectric motor provided in the haptic feedback controller of the present invention is fundamentally a motor that has excellent response characteristics. This means that the haptic feedback controller of the present invention can produce natural-feeling haptic feedback with simple control.

The piezoelectric motor provided in the haptic feedback controller of the present invention is fundamentally able to change the direction of rotation at high speed. This means that it becomes possible to rapidly operate the cap, so that the haptic feedback controller of the present invention can express a wide variety of haptic feedback.

The piezoelectric motor provided in the haptic feedback controller of the present invention also fundamentally has high moving resolution in the direction of rotation. This means that the haptic feedback controller according to the present invention can express a wide variety of haptic feedback.

The piezoelectric motor provided in the haptic feedback controller according to the present invention does not use electromagnetism for rotation. This means that the haptic feedback controller of the present invention can be favorably used in applications where magnetism is problematic.

The piezoelectric motor provided in the haptic feedback controller according to the present invention also has extremely low power consumption. This means that the haptic feedback controller of the present invention can be a haptic feedback controller with extremely low power consumption.

The piezoelectric motor provided in the haptic feedback controller according to the present invention can be realized with an extremely short length in the direction of the rotational axis. Also, in the haptic feedback controller according to the present invention, there is no need to use a belt transmission mechanism. This means that the haptic feedback controller according to the present invention can be slim in the direction of the rotational axis of the piezoelectric motor.

Also, in the haptic feedback controller according to the present invention, a comparatively large space can be provided between the base and the cap, so that the rotation control device and the rotational state detecting device described above can be disposed inside this space. This means that the haptic feedback controller according to the present invention can be a compact haptic feedback controller.

The haptic feedback controller according to the present invention uses a piezoelectric motor that has a ring-shaped stator and a ring-shaped rotor as the driving source for the haptic feedback, so that it is possible to provide a cavity in the center of the haptic feedback controller. This means that the haptic feedback controller can be a ring-shaped haptic feedback controller.

In the haptic feedback controller of the present invention, the case can be constructed of the base and the cap, so that there is no need to provide a separate case. For this reason, the haptic feedback controller according to the present invention can be a haptic feedback controller with a simple shape.

For these reasons, with the haptic feedback controller according to the present invention, it is possible to construct a compact, slim, and simple ring-shaped haptic feedback controller, that is, a haptic feedback controller with a stylish, attractive design.

In the haptic feedback controller of the present invention, fastening in screws, applying adhesive, fixing with pins, or fitting and fixing the parts together using elastic force, or pressing the cap onto the base in a state where the piezoelectric motor has been disposed between the base and the cap can be given as favorable examples of how the stator may be fixed to the base. The same is also the case for fixing the rotor to the cap.

It should be noted that as described above, although an example has been described where the user of the haptic feedback controller operates the cap, the present invention is not limited to this and it is also possible for the user to operate the base and also possible for the user to operate both the base and the cap with both hands, for example.

(2) The haptic feedback controller described in (1) above should preferably further include an input/output device that has a function for outputting rotational state information based on a detection result of the rotational state detecting device and a function for receiving an input of feedback information used for controlling the rotational state of the piezoelectric motor.

The haptic feedback controller according to the present invention can be used having been incorporated into the controlled appliance or can be used having been incorporated into another controller for controlling the controlled appliance. However, with the construction in (2) above, the haptic feedback controller of the present invention can be used as it is as a controller of the controller appliance.

It should be noted that in the haptic feedback controller of the present invention, the input/output device may have a function for outputting information aside from the rotational state information. As one example, the information aside from the rotational state information may be information generated when a switch or button that may be provided on the haptic feedback controller has been pressed.

Also, in the haptic feedback controller of the present invention, the input/output device may have a function for receiving an input of information aside from the feedback information. As examples, the information aside from the feedback information may be message information that the controlled appliance wishes to transmit to the user or information for controlling a light source that may be provided on the haptic feedback controller.

(3) In the haptic feedback controller described in (1) or (2) above, a shock absorbing member should preferably be provided between the base and the stator and/or between the cap and the rotor.

By having the rotor press the stator in the piezoelectric motor with a large pressing force, it is possible to obtain a large pressing force even when the piezoelectric motor is rotating at low speed. In the haptic feedback controller of the present invention, by using the construction described in (3) above, the base and the cap are attached via a shock absorbing member, so that the rotor can press the stator with a large pressing force. This means that in the haptic feedback controller of the present invention, large haptic feedback can be applied to the cap even when the cap is rotating at low speed, so that an even wider variety of haptic feedback can be expressed.

On the other hand, in the piezoelectric motor, by having the rotor press the stator in the piezoelectric motor with a small pressing force, it is possible to reduce the power consumption of the piezoelectric motor. This means that in the haptic feedback controller of the present invention, by attaching the base and the cap with a shock absorbing member in between, it is also possible for the rotor to press onto the stator with a small pressing force. As a result, the power consumption of the haptic feedback controller can be reduced.

In the haptic feedback controller described in (3) above, a shock absorbing member may be provided between the base and the piezoelectric motor, between the piezoelectric motor and the cap, or in both such positions.

A ring-shaped plate spring or a ring-shaped shock absorbing material made of silicone resin or rubber can be favorably used as the shock absorbing member. By attaching the base and the cap with this kind of shock absorbing member disposed between the base and the piezoelectric motor and/or between the piezoelectric motor and the cap, it becomes possible to press the rotor onto the stator with a predetermined pressing force.

When a ring-shaped shock absorbing material is used as the shock absorbing member(s), it is more preferable to attach the base and the cap with shock absorbing members disposed both between the base and the piezoelectric motor and between the piezoelectric motor and the cap. By doing so, it becomes possible to press the rotor onto the stator more favorably.

(4) In the haptic feedback controller described in (3) above, a ring-shaped sliding member should preferably be provided between the stator and the rotor.

According to the above construction, the sliding state between the stator and the rotor is improved, so that it is possible to improve the feel of the haptic feedback controller during use and to reduce undesirable noise that can be generated during use of the haptic feedback controller.

In this case, the sliding member should preferably be provided on a surface of the rotor that faces the stator. The sliding member should preferably be made of organic resin, such as Delrin (trademark) resin, acetal resin, fluororesin or the like, with a thickness in a range of 0.1 mm to 1 mm. Here, if the sliding member is over 1 mm thick, there are cases where there is a loss in the produced torque, while if the sliding member is under 0.1 mm thick, there are cases where the sliding characteristics and the durability of the sliding member fall.

In this case, it is preferable for the surface of an elastic body of the stator to be subjected to an ion plating process. This is because doing so improves the long-term reliability of the elastic body.

The sliding member may be provided on a surface of the stator that faces the rotor. In this case, the stator is normally composed of a piezoelectric body and an elastic body, and therefore the sliding member is provided on the surface of the elastic body.

(5) The haptic feedback controller described in any of (1) to (4) above should preferably further include a mechanism for changing a distance between the base and the cap in a direction in which pressure is applied.

According to the above construction, by changing the pressure of the rotor on the stator, it is possible to change the magnitude of the torque and the amount of power consumption for the piezoelectric motor. In this way, according to a user setting, the haptic feedback controller of the present invention can be set as a haptic feedback controller capable of strong haptic feedback and of expressing a wide range of haptic feedback or as a haptic feedback controller with low power consumption.

In this case, a cam mechanism, a screw mechanism, or other mechanism can be favorably used as the function for changing a distance between the base and the cap in a direction in which pressure is applied.

It should be noted that in the haptic feedback controller of the present invention, by changing the force by which the user presses the cap onto the base, it is also possible to directly change the pressing force of the rotor on the stator. In this case, strong haptic feedback is obtained when the cap is pressed with a strong force and weak haptic feedback is obtained when the cap is pressed with a weak force, so that the haptic feedback controller can be used as a haptic feedback controller that can express a wide variety of feedback or as a haptic feedback controller with low power consumption.

(6) In the haptic feedback controller described in any of (1) to (5) above, the base and the cap should preferably be integrated with a bearing mechanism in between.

According to the above construction, it is possible to make the cap rotate smoothly with respect to the base, which improves the feel of the haptic feedback controller. A ball bearing or a sliding mechanism can be favorably used as the bearing mechanism.

(7) In the haptic feedback controller described in any of (1) to (6) above, it is preferable for the rotational state detecting device to include an encoding barcode fixed to an inner surface of the cap and a sensor unit fixed to an inner surface of the base, and by detecting movement of the encoding barcode with the sensor unit, to detect the rotational state of the cap with respect to the base.

The cap has a larger radius than the piezoelectric motor. For this reason, according to the above construction, compared to a case where a barcode fixed to the piezoelectric motor is used, it is possible to detect the rotational state of the cap with respect to the base with high precision. Also, as described above, the haptic feedback controller of the present invention has a high moving resolution and high torque performance. This means that the haptic feedback controller of the present invention can express a wider variety of haptic feedback.

The fixing of the encoding barcode to the inner surface of the cap can be carried out by sticking the encoding barcode to the inner surface of the cap or can be carried out by patterning where a pattern of the encoding barcode is printed on the inner surface of the cap.

In the haptic feedback controller described in (7) above, the sensor unit should preferably be an optical sensor unit.

(8) In the haptic feedback controller described in any of (1) to (6) above, it is preferable for the rotational state detecting device to detect the rotational state of the piezoelectric motor by analyzing a current flowing through the piezoelectric motor.

With the above construction, it is possible to detect the rotational state of the piezoelectric motor with high precision. This means that in the same way as the haptic feedback controller described in (7) above, the haptic feedback controller according to the present invention can express a wider variety of haptic feedback.

(9) For the haptic feedback controller described in any of (1) to (8) above, it is preferable for the haptic feedback controller to be ring-shaped.

With the above construction, the ring shape itself encourages the user to rotate the cap with one hand, so that a more intuitive haptic feedback controller can be constructed. It should be noted that in this specification, the expression "ring-shaped" is used to include the concept of a donut shape.

(10) For the haptic feedback controller described in (9) above, it is preferable for the base and the cap to be disposed so as to face one another with a predetermined gap between the respective outer circumferential parts thereof, and for a plurality of contact switches that are disposed apart from one another in a circumferential direction to be disposed on at least one of the outer circumferential parts.

With the above construction, by tilting the cap with respect to the base by a predetermined angle, the user can switch on any contact switch out of a plurality of the contact switches. By doing so, it is possible to output predetermined control information to the controlled appliance. It is also possible to select one out of predetermined operation modes of the haptic feedback controller.

In this case, the predetermined gap should preferably be a value selected in a range of 0.1 mm to 3 mm, with a value selected in a range of 0.2 mm to 1.5 mm being more preferable.

It is also preferable to use contact switches that have a favorable click feel as the contact switches.

As the contact switches, it is also possible to use contact switches that have a poor click feel as the contact switches. In this case, when a contact switch is turned on or off, predetermined haptic feedback should preferably be provided to the cap.

As the plurality of contact switches, it is preferable to use two, three, four, six, or eight contact switches, with four or eight contact switches being more preferable.

In the haptic feedback controller described in (10) above, an amount of play should preferably be provided between the base and the cap so that it is possible to tilt the cap with respect to the base by a predetermined angle.

(11) For the haptic feedback controller described in either (9) or (10) above, a plurality of contact switches disposed apart from one another in a circumferential direction should preferably be disposed on an inner circumferential surface of the haptic feedback controller.

With the construction described above, by clicking the inner circumferential surface of the base with his or her finger, the user can switch on one of the contact switches out of the plurality of contact switches. By doing so, it is possible to output predetermined control information to the controlled appliance. It is also possible to select one out of a plurality of operation modes in the haptic feedback controller.

In the same way as the haptic feedback controller described in (10) above, contact switches with a favorable click feel should preferably be used as the contact switches.

As the contact switches, it is also possible to use contact switches that have a poor click feel as the contact switches. In this case, when a contact switch is turned on or off, predetermined haptic feedback should preferably be provided to the cap.

As the plurality of contact switches, it is preferable to use two, three, four, six, or eight contact switches, with four or eight contact switches being more preferable.

(12) For the haptic feedback controller described in any of (1) to (11) above, a non-slip member should preferably be provided on a bottom surface of the base.

With the above construction, the base is prevented from slipping when the cap is rotated, so that the feel is improved when the cap is rotated.

In this case, when it is necessary to slide the haptic feedback controller itself on a desktop like a mouse, the haptic feedback controller should preferably have a mechanism that prevents the non-slip member from functioning.

(13) The haptic feedback controller described in any of (1) to (12) above should preferably further include a function for controlling the piezoelectric motor, when the user has rotated the cap, to maintain a rotated state.

Piezoelectric motors fundamentally have a large detent torque. Accordingly, when the user rotates the cap, the user experiences a large resistance that hinders the rotation of the cap. This resistance is prominent when the rotor is set so as to press onto the stator with a large pressing force so that large haptic feedback is applied to the cap. For this reason, there can, be cases where it is difficult to smoothly rotate the cap with a light force.

However, with a construction such as (13) above, the piezoelectric motor is controlled when the user has rotated the cap so as to maintain the rotational state thereof, so that it is possible for the user to smoothly rotate the cap with a light force, which improves the usability of the haptic feedback controller.

(14) The haptic feedback controller described in any of (1) to (13) above should preferably further include a function for controlling the piezoelectric motor, when the user has rotated the cap, so that the rotor moves in a direction away from the stator.

With the above construction, when the user has rotated the cap, the piezoelectric motor is controlled so that the rotor moves away from the stator, so that the pressure of the rotor on the stator decreases. This means that it is possible for the user to smoothly rotate the cap with a light force, which improves the feel of the haptic feedback controller in the same way as (13) described above.

(15) The haptic feedback controller described in any of (1) to (14) above should preferably further include a function for controlling the piezoelectric motor, when the user has caused a change in the rotational state of the cap, so that the rotational state after the change is maintained.

With the above construction, when the user has rotated the cap of the haptic feedback controller at a certain rotational speed, the piezoelectric motor maintains the rotational state thereof, while when the user has stopped the rotation of the cap of the haptic feedback controller, the piezoelectric motor maintains the rotational state after the rotation has been stopped, so that the haptic feedback controller according to the present invention can be used as the shuttle of a jog shuttle or as a turntable used by a disc jockey. In addition, the haptic feedback controller according to the present invention can be used as a jog dial of a jog shuttle, and therefore can be favorably used with various kinds of image/audio editing appliances.

(16) The haptic feedback controller described in any of (1) to (15) above should preferably further include a function that carries out rotational control of the piezoelectric motor to have various kinds of sound emitted, to have various kinds of vibration produced, and/or to have various kinds of resistance applied to the cap.

With the above construction, as the object of the haptic feedback or as a separate object to the haptic feedback, it is possible for the haptic feedback controller according to the present invention to be capable of a wide variety of expressions. As examples, the various kinds of sound can include clicking, rapid pulses, and a screwing sound. As another example, sounds based on a talking human voice or an animal sound may be produced. As examples, the various kinds of vibration can include vibrations such as slow, shallow vibration, sudden irregular vibration, slow, relaxed vibration, stiff, sharp vibration, and, slow, steady vibration. The various kinds of resistance can include resistance similar to striking a hard wall, resistance similar to striking a soft wall, resistance similar to climbing a hill, resistance similar to walking on a gravel road, and resistance similar to piercing a firm jelly with a needle. By doing so, various types of effective feedback can be provided to the user.

As one example of a separate object to the haptic feedback, a message relating to language information can be transmitted to the user.

(17) The haptic feedback controller described in any of (1) to (16) above should preferably further include a plurality of light sources disposed apart from one another in a circumferential direction.

With the above construction, by controlling how the plurality of light sources flash, operation mode information for the haptic feedback controller itself, operation mode information for the controlled appliance and other valuable information can be provided to the user. It is also possible to improve the value of the haptic feedback controller as a design object.

In this case, control over the plurality of light sources can be carried out based on information outputted to the controlled appliance, based on information from the controlled appliance, based on information from the control unit, and/or based on other information.

(18) For the haptic feedback controller described in any of (1) to (17) above, the input/output device should preferably include an input/output interface that can obtain a power supply from the controlled appliance.

With the above construction, it is possible to cause the piezoelectric motor to produce sufficiently large torque, so that a haptic feedback controller that can express a wider variety of haptic feedback can be constructed.

IEEE 1394, USB 2.0 and the like can be given as examples of an input/output interface that can obtain a power supply from the controlled appliance.

(19) For the haptic feedback controller described in any of (1) to (17) above, the input/output device should preferably include an input/output interface that can wirelessly exchange information with the controlled appliance.

With the above construction, it is possible to remotely control the controlled appliance, which improves user convenience.

Bluetooth, ZigBee, NFC, an infrared interface and the like can be given as examples of an input/output interface for wirelessly exchanging information with the controlled appliance.

(20) For the haptic feedback controller described in any of (1) to (19) above, the rotation control device and the rotational state detecting device should preferably be disposed in a space formed between the base and the cap.

With the above construction, it is possible to construct a compact haptic feedback controller.

(21) For the haptic feedback controller described in any of (1) to (20) above, the controlled appliance should preferably be one of a PC, a household electrical good, a game system, a toy, a content editing appliance, a means of transport, a machine tool, and a medical appliance.

With the above construction, it is possible to control a PC, a household electrical good, a game system, a toy, a content editing appliance, a means of transport, a machine tool, or a medical tool as a controlled appliance with a favorable feel.

When the controlled appliance is a PC, the haptic feedback controller according to the present invention can be used in place of or in addition to a mouse. By doing so, it becomes possible to intuitively operate the PC, which improves usability.

When the controlled appliance is a household electrical good (for example, a TV, a video recorder, or a DVD player), the haptic feedback controller according to the present invention can be used as a remote controller. It is also possible to use the haptic feedback controller according to the present invention in place of the buttons on a conventional remote controller. By doing so, it is possible to operate household electrical goods more intuitively, which improves the usability of the household electrical goods.

When the controlled appliance is a game system (such as a commercial game system or a home game system), it is possible to use the haptic feedback controller according to the present invention in addition to a control lever. By doing so, it is possible to provide more realistic feedback from the game system, which makes games more realistic and exciting.

When the controlled appliance is a toy (such as a radio-controlled car or a radio-controlled plane), it is possible to use the haptic feedback controller according to the present invention in addition to a control lever. By doing so, it is possible to provide more realistic feedback for the environment in which the toy is located (for example, when a radio-controlled car has fallen into a gutter), which makes the toy more fun to play with.

When the controlled appliance is a content editing appliance (such as a video editing appliance or an audio editing appliance), it is possible to use the haptic feedback controller according to the present invention as a jog dial, a shuttle, or the like on a control panel. By doing so, it is possible to use the content editing appliance more intuitively, which improves the usability of the content editing appliance.

When the controlled appliance is a means of transport (for example, a car, a train, a ship, or an aircraft), the haptic feedback controller according to the present invention can be used on a control panel. By doing so, it is possible to operate the control panel more intuitively, which improves the usability of the control panel. Since it is possible to provide the haptic feedback controller with a variety of functions, the number of buttons and knobs can be reduced, so that the interior of the means of transport can be made simpler.

When the controlled appliance is a machine tool (for example, a cutting apparatus, a press apparatus, or a drilling machine), the haptic feedback controller according to the present invention can be used on a control panel. By doing so, it is possible to operate the machine tool more intuitively, which improves the usability of the machine tool. As one example, when the machine tool is a cutting apparatus, since it is possible to determine the cutting conditions while feeling the stress received by the cutting blade, after such determination it is possible to always carry out cutting under optimal conditions, which makes it possible to improve the quality of cut products and to extend the lifespan of the cutting blade.

When the controlled appliance is a medical appliance (such as a surgery assisting apparatus or an endoscope), it is possible to use the haptic feedback controller according to the present invention as a knob for controlling the movement of a knife or an endoscope. By doing so, it is possible to operate the medical appliance more intuitively, so that more appropriate medical procedures can be carried out than before.

(22) A method of controlling a haptic feedback controller according to the present invention is a method that controls a haptic feedback controller including a piezoelectric motor as a driving source for causing haptic feedback, and includes a step of controlling the piezoelectric motor, when the user has caused the piezoelectric motor to rotate, to maintain a rotated state thereof.

As described above, piezoelectric motors are characterized by fundamentally having a large detent torque. Accordingly, when the piezoelectric motor is rotated by the user operating the haptic feedback controller, the user feels a large resistance that hinders the operation of the haptic feedback controller. This resistance is prominent when the haptic feedback controller is set so that the rotor presses onto the stator with a large pressing force. For this reason, there can be cases where it is difficult to smoothly rotate the cap of the haptic feedback controller with a light force.

However, with the method described above, when the user has rotated the piezoelectric motor, the piezoelectric motor is controlled so as to maintain the rotated state thereof, so that the haptic feedback controller can be operated smoothly with a light force, which improves the usability of the haptic feedback controller.

(23) A method of controlling a haptic feedback controller according to the present invention is a method that controls a haptic feedback controller including a piezoelectric motor as a driving source for causing haptic feedback, and includes a step of controlling the piezoelectric motor, when the user has caused the piezoelectric motor to rotate, so that a rotor of the piezoelectric motor moves away from a stator of the piezoelectric motor.

With the method described above, when the user has rotated the piezoelectric motor, the piezoelectric motor is controlled so that the rotor moves away from the stator, so that the haptic feedback controller can be operated smoothly with a light force, which improves the usability of the haptic feedback controller in the same way as (22) described above.

(24) The method of controlling a haptic feedback controller described in (22) or (23) should preferably further include a step of controlling the piezoelectric motor, when the user has caused a change in a rotational state of the piezoelectric motor, to maintain the rotational state thereof after the change.

With the above method, when the user has rotated the piezoelectric motor at a certain rotational speed, the piezoelectric motor maintains the rotational state thereof, while when the user has stopped the rotation of the piezoelectric motor, the piezoelectric motor maintains the rotational state after the rotation has been stopped, so that the haptic feedback controller according to the present invention can be used as the shuttle of a jog shuttle or as a turntable used by a disc jockey.

(25) A method of transmitting messages using a haptic feedback controller according to the present invention includes a step of controlling a motor for causing haptic feedback to have various kinds of sound emitted, to have various kinds of vibration produced, and/or to have various kinds of resistance applied to transmit a message relating to language information to the user.

The method of transmitting messages using a haptic feedback controller according to the present invention can transmit messages relating to language information to the user in a completely different way to before, so that it is possible to provide a completely new method of communication. According to this method of transmitting messages, a message relating to language information can be transmitted to a visually impaired user, for example, in a format that is easier to understand.

Here, a method that first converts the message relating to language information to Morse code or another kind of signal and has a haptic feedback controller vibrate in accordance with this signal can be given as an example of a method of transmitting a message relating to language information.

BEST MODE FOR CARRYING OUT THE INVENTION

Figure 1A:
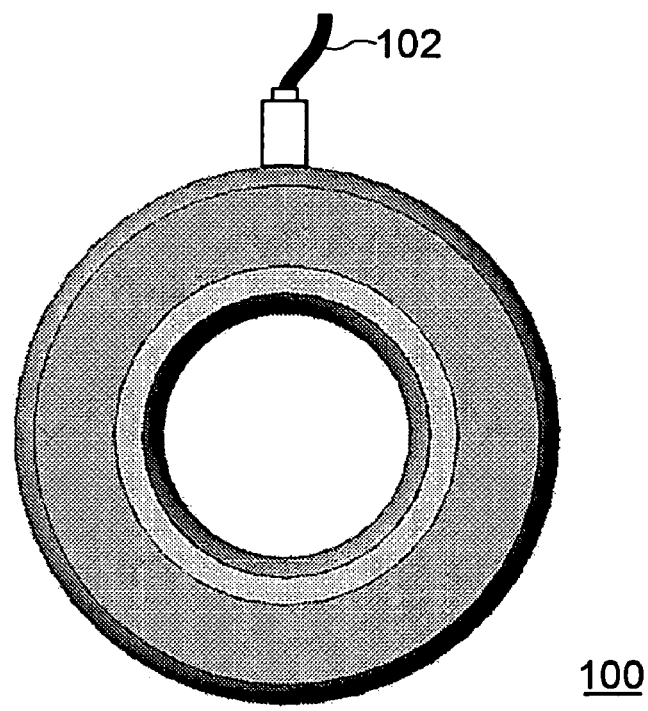
FIGS. 1A to 1C are series of diagrams useful in explaining a haptic feedback controller 100 of a first embodiment.

The following describes in detail a haptic feedback controller according to the present invention based on several embodiments shown in the drawings.

First Embodiment

Figure 1B:
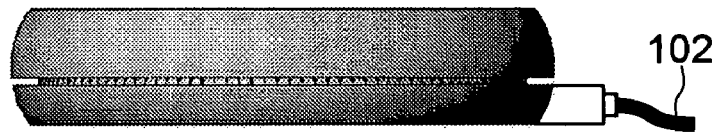
Figure 1C:
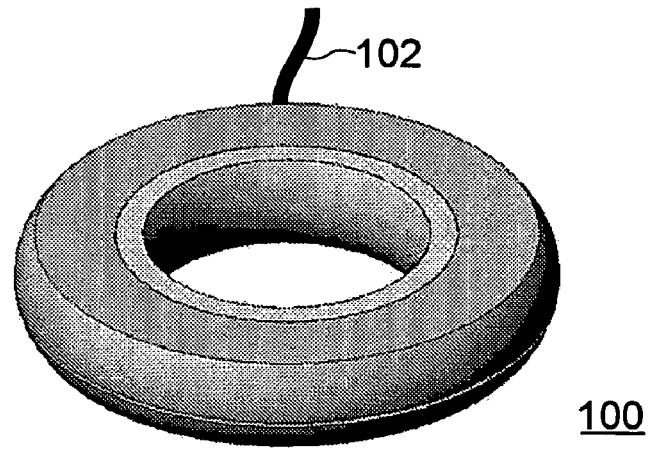

FIG. 1 is a series of diagrams useful in explaining a haptic feedback controller 100 according to a first embodiment. FIG. 1(A) is a plan view of the haptic feedback controller 100, FIG. 1(B) is a right-side elevation of the haptic feedback controller 100, and FIG. 1(C) is a perspective view of the haptic feedback controller 100.

Figure 2:
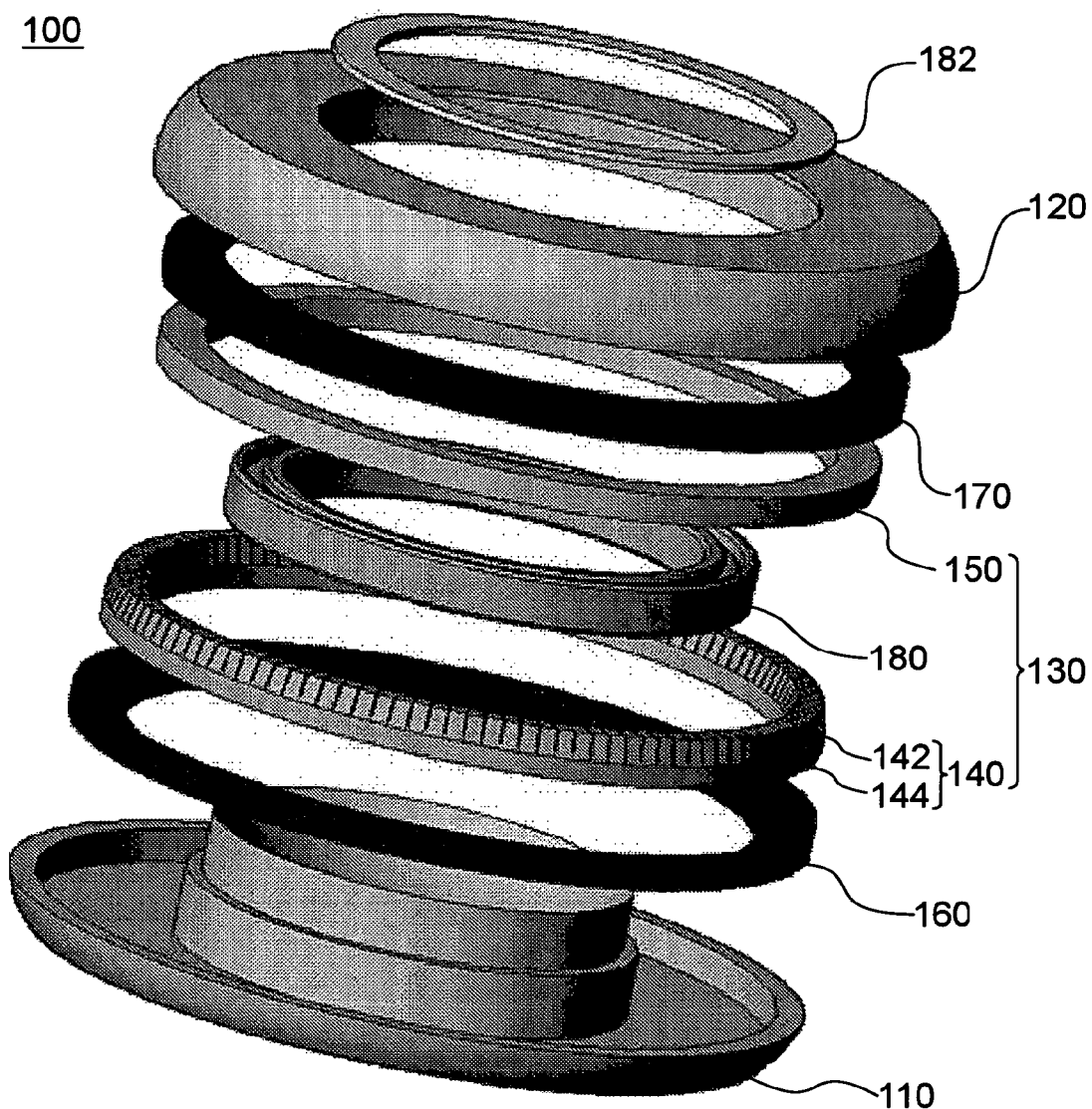
FIG. 2 is an exploded perspective view useful in explaining the haptic feedback controller 100 according to the first embodiment.

FIG. 2 is an exploded perspective view useful in explaining the haptic feedback controller 100 according to the first embodiment.

Figure 3:
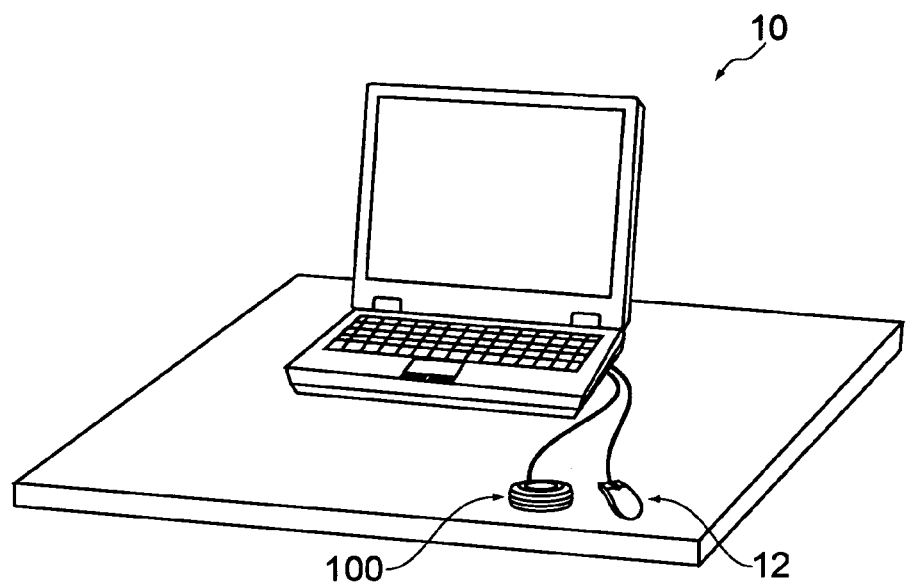
FIG. 3 is a diagram useful in explaining how the haptic feedback controller 100 according to the first embodiment is used.

FIG. 3 is a diagram useful in explaining a state in which the haptic feedback controller 100 according to the first embodiment is used.

Figure 4:
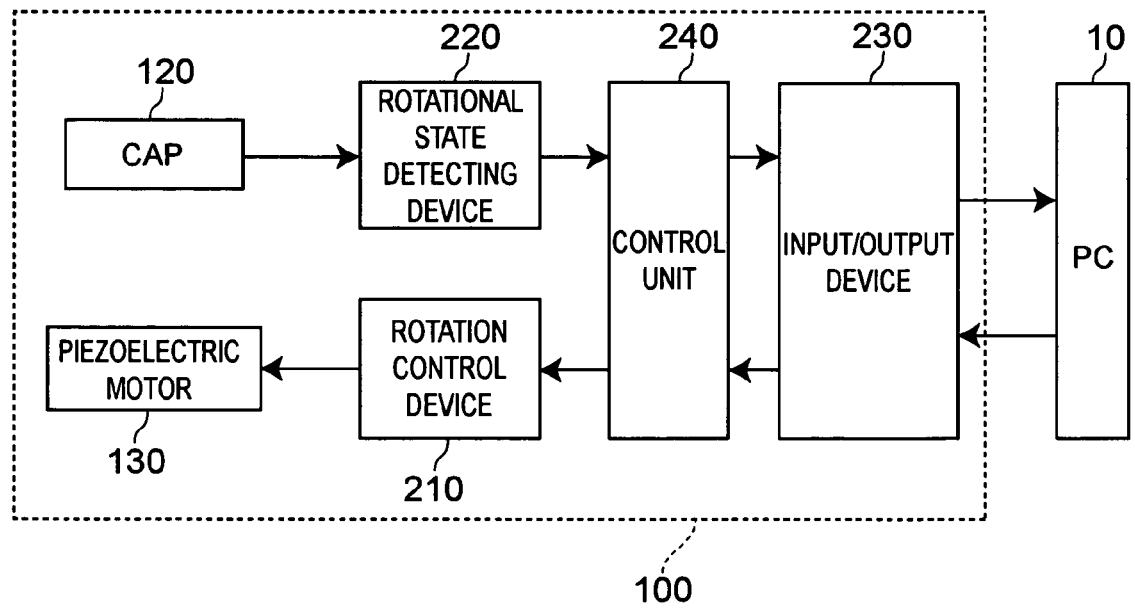
FIG. 4 is a block diagram useful in explaining the functions of the haptic feedback controller 100 according to the first embodiment.

FIG. 4 is a block diagram useful in explaining the functions of the haptic feedback controller 100 according to the first embodiment.

FIG. 5 is a series of diagrams useful in explaining the haptic feedback controller 100 according to the first embodiment.

Figure 5A:
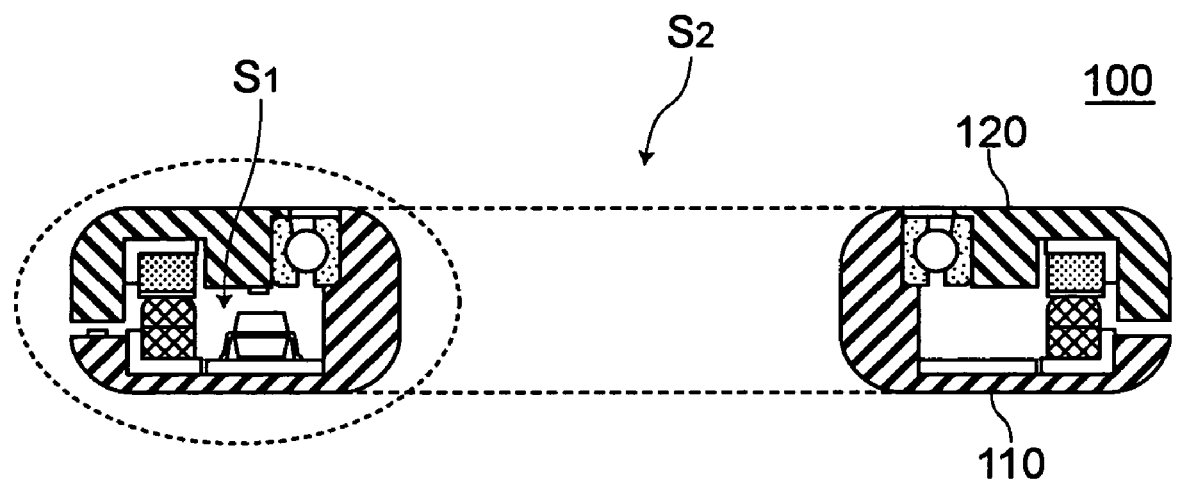
FIGS. 5A and 5B are series of diagrams useful in explaining the haptic feedback controller 100 according to the first embodiment.
Figure 5B:
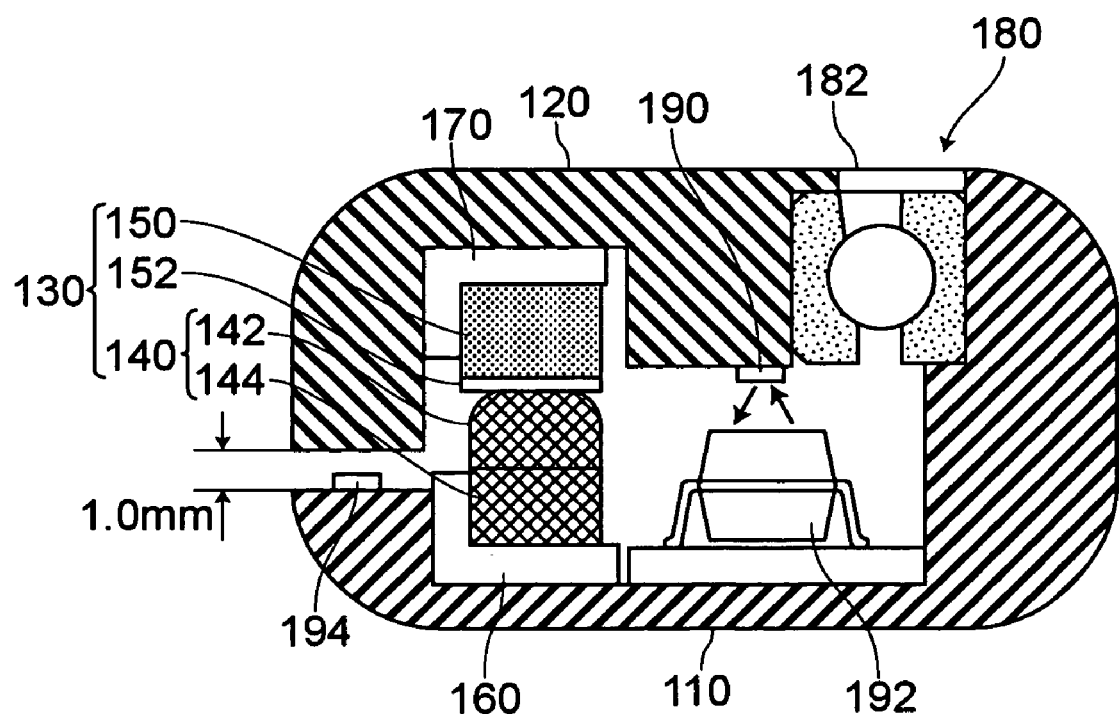

FIG. 5(A) is a cross-sectional view of the haptic feedback controller 100 and FIG. 5(B) is an enlarged view of part of FIG. 5(A).

Figure 6:
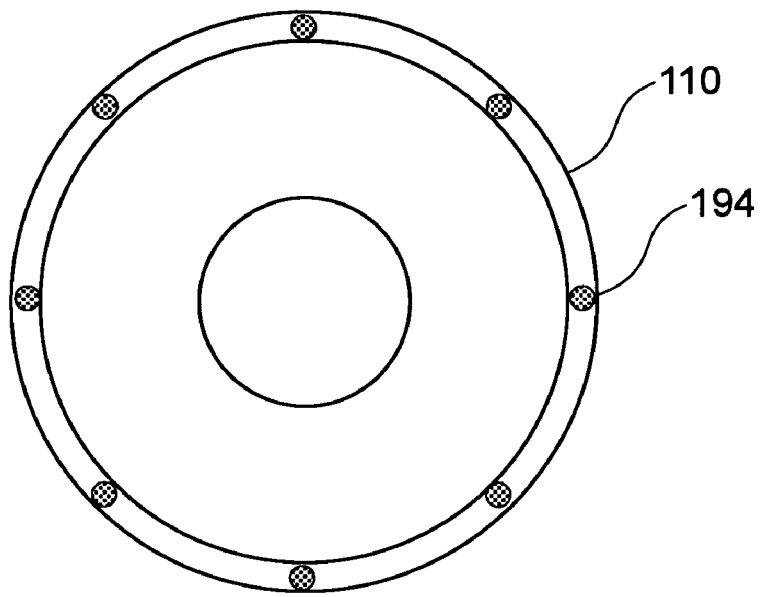
FIG. 6 is a diagram useful in explaining the haptic feedback controller 100 according to the first embodiment.

FIG. 6 is a diagram useful in explaining the haptic feedback controller 100 according to the first embodiment.

Figure 7:
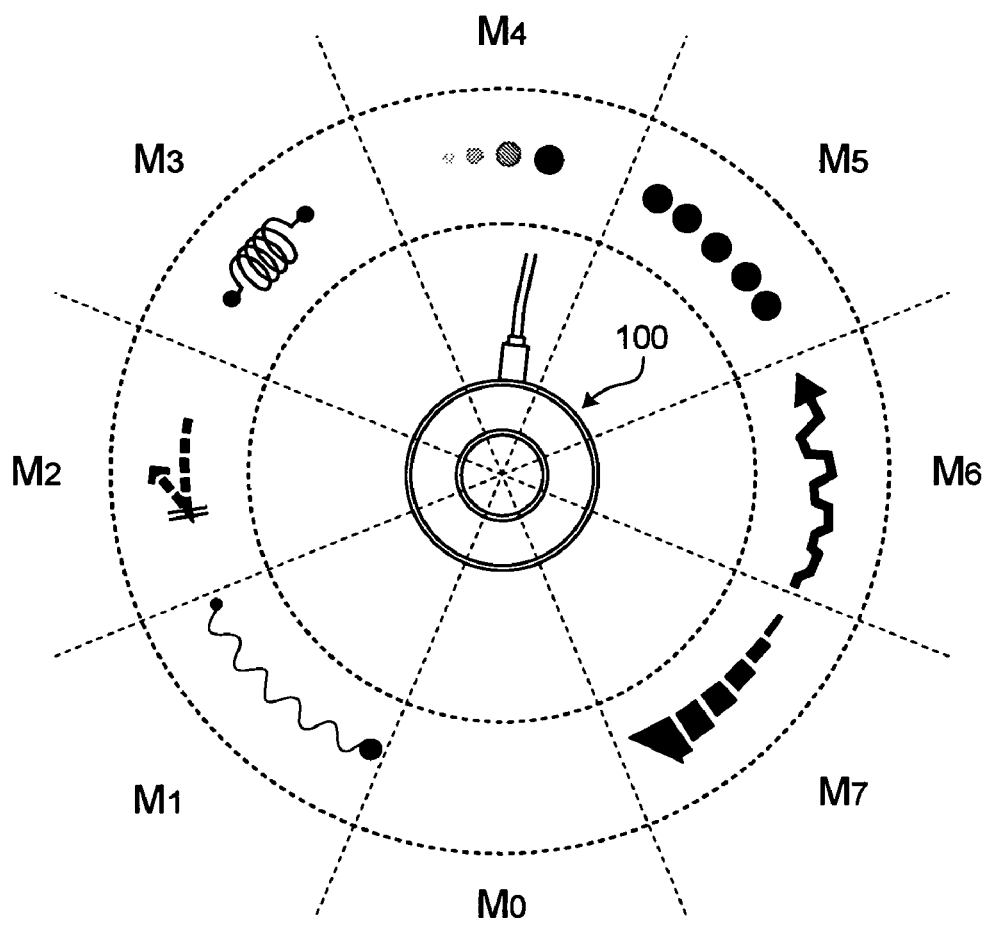
FIG. 7 is a diagram schematically showing the functions of the haptic feedback controller 100 according to the first embodiment.

FIG. 7 is a diagram schematically showing the functions of the haptic feedback controller 100 according to the first embodiment.

As shown in FIGS. 1A, 1C and 2, the haptic feedback controller 100 according to the first embodiment is ring-shaped. As shown in FIGS. 3 and 4, the haptic feedback controller 100 according to the first embodiment is a haptic feedback controller for controlling a PC 10 as a controlled appliance.

As shown in FIG. 2, the haptic feedback controller 100 according to the first embodiment includes a base 110, a cap 120, and a piezoelectric motor 130.

The base 110 is ring-shaped and has an inner circumferential surface that forms the inner circumferential surface of the haptic feedback controller 100, and is made of a material such as a metal like aluminum, titanium alloy, or stainless steel, a wood like ebony, zelkova, or mahogany, or a resin material like polyurethane resin, polycarbonate resin, or ABS resin.

The cap 120 is ring-shaped and is attached so as to be rotatable with respect to the base 110. The cap 120 can be made of the same materials as the base 110.

As shown in FIG. 2, the piezoelectric motor 130 is disposed between the base 110 and the cap 120. The piezoelectric motor 130 includes a ring-shaped stator 140 and a ring-shaped rotor 150. The stator 140 is fixed to the base 110 via a shock absorbing member 160 made of silicone resin or rubber and the rotor 150 is fixed to the cap 120 via a shock absorbing member 170 made of silicone resin.

The stator 140 is composed of a ring-shaped piezoelectric body 144 and a ring-shaped elastic body 142. A sliding member 152 (see FIG. 5(B)) that is made of Delrin resin and is 0.2 mm thick is provided on the surface of the rotor 150 that faces the stator 140. In place of the Delrin resin, it is also possible to use fluororesin or another kind of resin.

The stator 140 is fixed to the base 110 by being fitted onto the base 110 using elastic force and the rotor 150 is fixed to the cap 120 by being fitted onto the cap 120 using elastic force.

The base 110 and the cap 120 are integrated via a ball bearing 180 as a bearing mechanism. The ball bearing 180 is capped with a cover 182.

It should be noted that the reference numeral 102 shown in FIGS. 1A, 1B and 1C designates an IEEE 1394 cable as an input/output interface that will be described later.

As shown in FIG. 4, the haptic feedback controller 100 including the components described above further includes a rotation control device 210 for controlling the rotational state of the piezoelectric motor 130, a rotational state detecting device 220 for detecting a rotational state of the cap 120 with respect to the base 110, an input/output device 230 that has a function of outputting rotational state information based on a detection result of the rotational state detecting device 220 and a function for receiving an input of feedback information used to control the rotational state of the piezoelectric motor 130, and a control unit 240 that controls the rotation control device 210, the rotational state detecting device 220, and the input/output device 230. It should be noted that the arrows in FIG. 4 show the directions in which information flows.

The haptic feedback controller 100 according to the first embodiment can be used as follows.

First, the user rotates the cap 120. In response, the rotational state detecting device 220 detects the rotational state of the cap 120 with respect to the base 110 and outputs the detection result to the control unit 240. In response, the control unit 240 has the input/output device 230 output rotational state information, which is based on the detection result of the rotational state detecting device 220, to the PC 10 that is the controlled appliance to carry out the required control of the PC 10. It should be noted that the control unit 240 can also change the operation mode of the haptic feedback controller 100 itself based on the detection result of the rotational state detecting device 220.

At this time, the PC 10 outputs feedback information, which is based on the rotational state information and the state of an application that is active inside the PC 10 and which is to be used to control the rotational state of the piezoelectric motor 130, to the haptic feedback controller 100. The input/output device 230 receives an input of the feedback information from the PC 10 and outputs the feedback information to the control unit 240. The control unit 240 outputs the feedback information to the rotation control device 210 and controls the rotation of the piezoelectric motor 130. Based on the feedback information, the control unit 240 can also change the operation mode of the haptic feedback controller 100 itself.

In this way, with the haptic feedback controller 100 according to the first embodiment, when the user operates the cap 120, haptic feedback in response to such operation is provided to the piezoelectric motor 130 and moreover to the cap 120.

This means that with the haptic feedback controller 100 according to the first embodiment, the piezoelectric motor 130 that can provide a large torque even during low speed-rotation is used as the driving source for haptic feedback, so that even when the cap 120 is rotated at low speed, sufficiently large haptic feedback can be applied to the cap 120. Also, since the base 110 and the cap 120 are respectively fixed to the stator 140 and the rotor 150 of the piezoelectric motor 130, there is no backlash.

As a result, there is no loss in the ability to express haptic feedback and the haptic feedback controller 100 according to the first embodiment is a haptic feedback controller that can express a wide variety of haptic feedback.

The piezoelectric motor 130 provided in the haptic feedback controller 100 according to the first embodiment is a motor that fundamentally has excellent response characteristics. This means that the haptic feedback controller 100 according to the first embodiment is a haptic feedback controller that can produce natural-feeling haptic feedback with simple control.

The piezoelectric motor 130 provided in the haptic feedback controller 100 according to the first embodiment is fundamentally capable of changing the direction of rotation at high speed. This means that it becomes possible to rapidly operate the cap 120, so that the haptic feedback controller 100 according to the first embodiment can express a wide variety of haptic feedback The piezoelectric motor 130 provided in the haptic feedback controller 100 according to the first embodiment also fundamentally has high moving resolution in the direction of rotation. This means that the haptic feedback controller 100 according to the first embodiment can express a wide variety of haptic feedback.

The piezoelectric motor 130 provided in the haptic feedback controller 100 according to the first embodiment does not use electromagnetism for rotation. This means that the haptic feedback controller 100 according to the first embodiment can be favorably used in applications where magnetism is problematic.

The piezoelectric motor 130 provided in the haptic feedback controller 100 according to the first embodiment also has extremely low power consumption. This means that the haptic feedback controller 100 according to the first embodiment is a haptic feedback controller that has extremely low power consumption.

The piezoelectric motor 130 provided in the haptic feedback controller 100 according to the first embodiment can be realized with an extremely short length in the direction of the rotational axis. Also, in the haptic feedback controller 100 according to the first embodiment, there is no need to use a belt transmission mechanism. This means that as shown in FIG. 1B, the haptic feedback controller 100 according to the first embodiment is a haptic feedback controller that is slim in the direction of the rotational axis of the piezoelectric motor.

Also, as shown in FIG. 5(A), in the haptic feedback controller 100 according to the first embodiment, a comparatively large space $S_1$ is provided between the base 110 and the cap 120. The rotation control device 210, the rotational state detecting device 220, the input/output device 230, and the control unit 240, none of which are shown, are disposed in this space $S_1$. This means that the haptic feedback controller 100 according to the first embodiment is a compact haptic feedback controller.

The haptic feedback controller 100 according to the first embodiment uses the piezoelectric motor 130 that has the ring-shaped stator 140 and the ring-shaped rotor 150 as the driving source for haptic feedback, so that it is possible to provide a cavity $S_2$ (see FIG. 5(A)) in the center of the haptic feedback controller 100. This means that as shown in FIG. 1, the haptic feedback controller 100 is a ring-shaped haptic feedback controller.

In the haptic feedback controller 100 according to the first embodiment, the case is constructed of the base 110 and the cap 120, so that there is no need to provide a separate case. For this reason, the haptic feedback controller 100 according to the first embodiment is a haptic feedback controller with a simple shape.

For these reasons, the haptic feedback controller 100 according to the first embodiment is a compact, slim, and simple ring-shaped haptic feedback controller, that is, a haptic feedback controller with a stylish, attractive design.

In the haptic feedback controller 100 according to the first embodiment, as described above, ring-shaped shock absorbing members 160, 170 made of silicone resin are provided between the base 110 and the piezoelectric motor 130 and between the piezoelectric motor 130 and the cap 120, respectively. By attaching the base 110 and the cap 120 via the shock absorbing members 160, 170, it is possible to press the rotor 150 with a large force onto the stator 140. For this reason, with the haptic feedback controller 100 according to the first embodiment, it is possible to provide a large haptic feedback to the cap 120 even during low-speed rotation of the cap 120, so that a wider variety of haptic feedback can be expressed.

It should be noted that it is also possible to attach the cap 120 to the haptic feedback controller 100 in a state where the rotor 150 applies little pressure on the stator 140. In this case, the power consumption of the haptic feedback controller 100 can be reduced.

In the haptic feedback controller 100 according to the first embodiment, as described above the ring-shaped sliding member 152 is provided on the surface of the rotor 150 that faces the stator 140. For this reason, the sliding state between the stator 140 and the rotor 150 is improved, the feel of the haptic feedback controller 100 is improved, and undesirable noise that can be generated during the use of the haptic feedback controller 100 can be reduced.

In addition, the surface of the elastic body 142 of the stator 140 is subjected to an ion plating process. This improves the long term reliability of the elastic body 142.

In the haptic feedback controller 100 according to the first embodiment, as described above the base 110 and the cap 120 are integrated via the ball bearing 180 as the bearing mechanism. For this reason, a state where the cap 120 smoothly rotates on the base 110 can be realized, which improves the feel of the haptic feedback controller 100 during use.

In the haptic feedback controller 100 according to the first embodiment, as shown in FIG. 5B, the rotational state detecting device 220 includes an encoding barcode 190 that is fixed to an inside surface of the cap 120 and an optical sensor unit 192 that is fixed to an inside surface of the base 110. The rotational state detecting device 220 is constructed so as to detect the rotational state of the cap 120 with respect to the base 110 by detecting the movement of the encoding barcode 190 with the optical sensor unit 192.

This means that according to the haptic feedback controller 100 according to the first embodiment, it is possible to detect the rotational state of the cap 120 with respect to the base 110 with high precision. Also, as described above, the haptic feedback controller 100 according to the first embodiment has a high moving resolution and a high torque performance. This means that the haptic feedback controller 100 according to the first embodiment can express an even wider variety of haptic feedback.

As described above, the haptic feedback controller 100 according to the first embodiment is ring-shaped, with the ring shape itself encouraging the user to rotate the cap 120 with one hand, so that a more intuitive haptic feedback controller can be constructed.

As shown in FIGS. 1B, 2, 5A and 5B, in the haptic feedback controller 100 according to the first embodiment, the base 110 and the cap 120 are disposed so as to face one another with a predetermined gap between their respective outer circumferential parts. Also as shown in FIG. 6, the outer circumferential part of the cap 120 is provided with eight contact switches 194 that are disposed a part from each other in the circumferential direction.

For this reason, with the haptic feedback controller 100 according to the first embodiment, the user can tilt the cap 120 by a predetermined angle with respect to the base 110 to switch on one out of the eight contact switches. By doing so, it is possible to output predetermined control information to the PC 10 and also to select one out of a plurality of predetermined operation modes of the haptic feedback controller 100 itself.

In this case, as shown in FIG. 5(B), the predetermined gap is 1.0 mm. Contact switches with a favorable click feel are used as the contact switches 194. A predetermined amount of play is provided for the ball bearing 180, which means that play is provided between the base 110 and the cap 120 and as a result, the cap 120 can be tilted by the predetermined angle with respect to the base 110.

In the haptic feedback controller 100 according to the first embodiment, silicon resin, rubber, or the like is stuck onto a bottom surface of the base 110 as a non-slip member.

In this case, when the cap 120 is rotated, the base 110 is prevented from slipping, so that the feel of the cap 120 when rotated is improved.

It should be noted that when it is necessary to slide the haptic feedback controller itself on a desktop like a mouse, the haptic feedback controller should preferably have a mechanism that prevents the material such as silicone resin or rubber from being exposed at the base surface and functioning as a non-slip member.

The haptic feedback controller 100 according to the first embodiment has a function that controls the piezoelectric motor 130, when the user has rotated the cap 120, so as to maintain the rotated state of the cap 120. The haptic feedback controller 100 according to the first embodiment also has a function for controlling the piezoelectric motor 130, when the user has rotated the cap 120, to move the rotor 150 in a direction away from the stator 140.

Piezoelectric motors fundamentally have a large detent torque, so that when the user rotates the cap, the user experiences a large resistance that hinders the rotation of the cap. This resistance is prominent when the rotor is set so as to press onto the stator with a large pressing force. For this reason, there can be cases where it is difficult to smoothly rotate the cap of the haptic feedback controller with a light force.

However, since the haptic feedback controller 100 according to the first embodiment is constructed as described above, when the user has rotated the cap 120, the piezoelectric motor 130 is controlled so as to maintain the rotated state and/or is controlled so that the rotor 150 moves in the direction away from the stator 140, so that it becomes possible for the user to rotate the cap 120 smoothly with a light force and a favorable feel is achieved for the haptic feedback controller 100.

The haptic feedback controller 100 according to the first embodiment has a function for controlling the piezoelectric motor 130, when the user has changed the rotational state of the cap 120, so as to maintain the rotational state after this change.

For this reason, with the haptic feedback controller 100 according to the first embodiment, when the cap 120 of the haptic feedback controller 100 has been rotated at a certain rotational speed, the piezoelectric motor 130 maintains the rotational state and when the user stops the rotation of the cap 120 of the haptic feedback controller 100, the piezoelectric motor 130 can maintain the rotational state of the cap 120 after the rotation has been stopped. By doing so, the haptic feedback controller 100 according to the first embodiment can be used as the shuttle of a jog shuttle or as a turntable used by a disc jockey. The haptic feedback controller 100 according to the first embodiment can also be used as a jog dial of a jog shuttle, and therefore can be favorably used with various kinds of image/audio editing appliances.

In this case, such control can be carried out based on instructions from the PC 10 and/or can be carried out based on instructions from the control unit 240 of the haptic feedback controller 100.

In the haptic feedback controller 100 according to the first embodiment, by carrying out rotation control of the piezoelectric motor 130, it is possible to have various kinds of sound emitted, to have various kinds of vibration produced, and to have various kinds of resistance applied to the cap 120 as shown in FIG. 7 (see $M_1$ to $M_7$).

For this reason, a wide variety of haptic feedback can be expressed by the haptic feedback controller 100 according to the first embodiment. As examples, the various kinds of sound can include clicking, rapid pulses, and a screwing sound. As another example, sounds based on a talking human voice or an animal sound may be produced. As examples, the various kinds of vibration can include vibrations such as slow, shallow vibration, sudden irregular vibration, slow, relaxed vibration, stiff, sharp vibration, and, slow, steady vibration. The various kinds of resistance can include resistance similar to striking a hard wall, resistance similar to striking a soft wall, resistance similar to climbing a hill, resistance similar to walking on a gravel road, and resistance similar to piercing a firm jelly with a needle. By doing so, various types of effective feedback can be provided to the user.

As a separate object to the haptic feedback, a message relating to language information can be transmitted to the user. Here, as one example of the method of transmitting a message relating to language information, the message relating to language information may be first converted to Morse code or another kind of signal, with the haptic feedback controller being vibrated in accordance with this signal.

In the haptic feedback controller 100 according to the first embodiment, the input/output device 230 includes an IEEE 1394 interface as an input/output interface that can obtain power from the PC 10 that is the controlled appliance.

This means that in the haptic feedback controller 100 according to the first embodiment, it is possible to have the piezoelectric motor 130 produce sufficiently large torque, so that a haptic feedback controller that can express a wider variety of haptic feedback can be constructed.

Aside from an IEEE 1394 interface, a USB 2.0 interface or the like can be given as an example of an input/output interface that can obtain power from the controlled appliance.

In the haptic feedback controller 100 according to the first embodiment, the rotation control device 210, the rotational state detecting device 220, the input/output device 230, and the control unit 240 are disposed as described above in the space $S_1$ formed between the base 110 and the cap 120, which makes the haptic feedback controller compact.

As described above, the haptic feedback controller 100 according to the first embodiment is a haptic feedback controller for controlling the PC 10, so that the haptic feedback controller 100 according to the first embodiment can be used in place of or in addition to a mouse 12. By doing so, it becomes possible to intuitively operate the PC 10, which improves usability.

By using the haptic feedback controller 100 according to the first embodiment, it becomes possible to provide a completely new method of transmitting messages. That is, by controlling the piezoelectric motor 130 in the haptic feedback controller 100 to produce haptic feedback, a variety of sounds can be emitted, a variety of vibration can be produced, and/or a variety of resistance can be produced to transmit a message relating to language information to the user.

The method of transmitting messages that uses the haptic feedback controller 100 according to the first embodiment can transmit a message relating to language information to the user in a completely different way to conventional methods, and therefore there is the potential for completely new methods of communication. According to this method of transmitting messages, a message relating to language information can be transmitted to a visually impaired user, for example, in a format that is easier to understand.

Here, a method that first converts the message relating to language information to Morse code or another kind of signal and has the haptic feedback controller vibrate in accordance with this signal can be given as an example of a method of transmitting a message relating to language information.

Second Embodiment

Figure 8A:
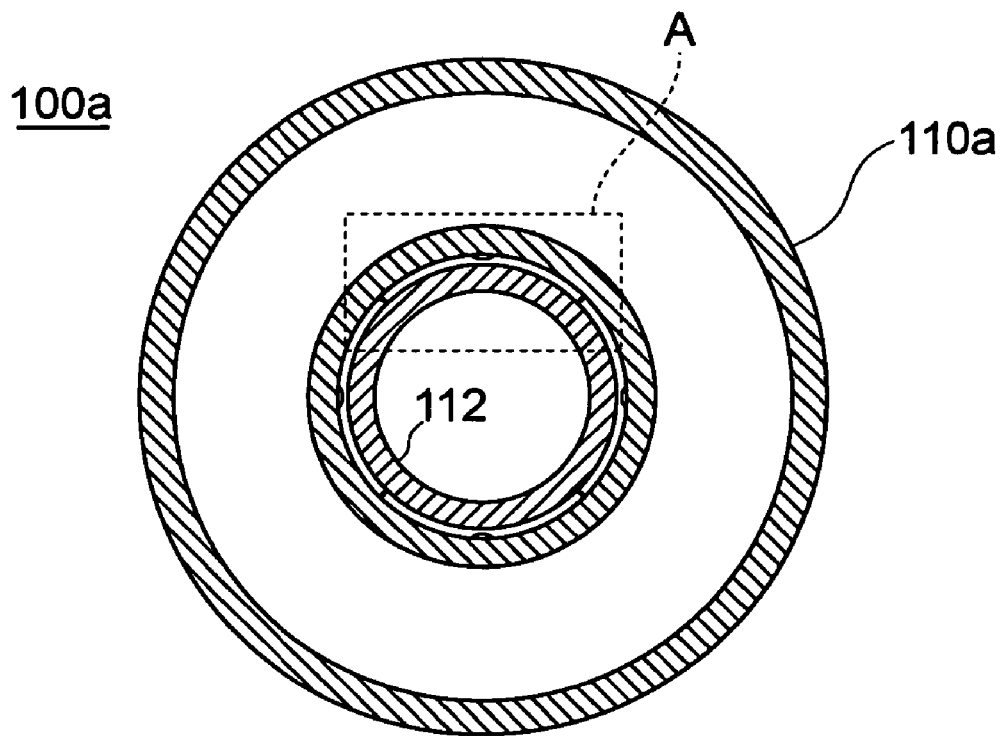
FIGS. 8A and 8B are series of diagrams useful in explaining a haptic feedback controller 100a according to a second embodiment.
Figure 8B:
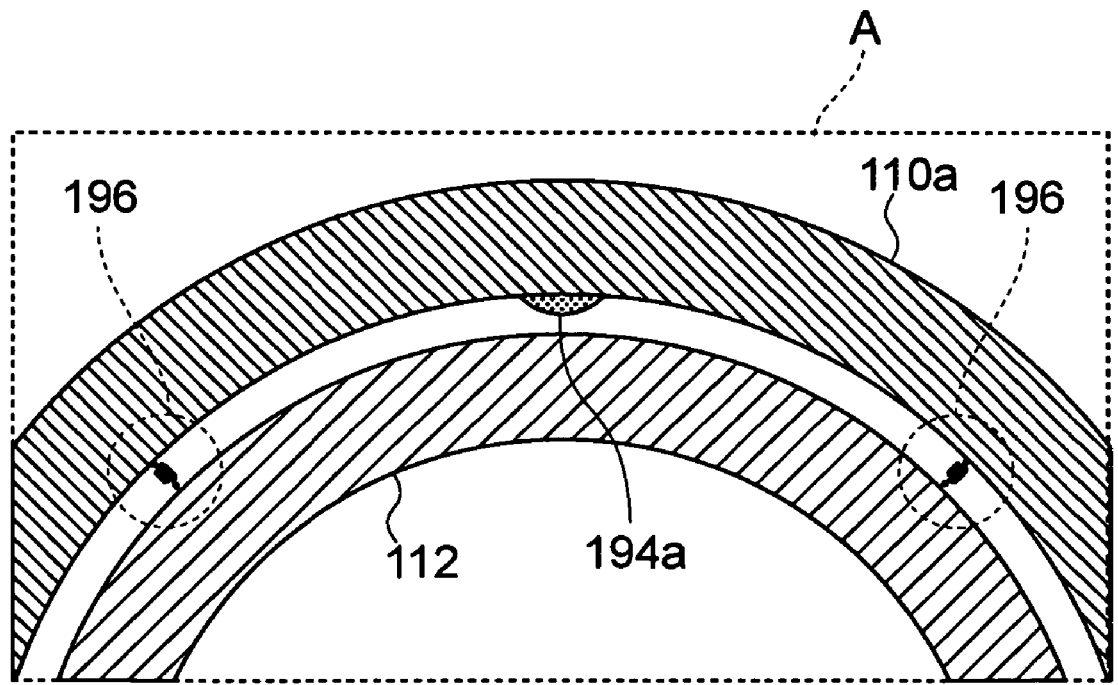

FIG. 8 is a series of diagrams useful in explaining a haptic feedback controller 100a according to a second embodiment. FIG. 8(A) is a cross-sectional view of the haptic feedback controller 100a according to the second embodiment and FIG. 8(B) is an enlarged view of part of FIG. 8(A).

The haptic feedback controller 100a according to the second embodiment fundamentally has the same construction as the haptic feedback controller 100 according to the first embodiment, but the construction of the contact switches differs to that used in the haptic feedback controller 100 according to the first embodiment. That is, in the haptic feedback controller 100a according to the second embodiment, as shown in FIGS. 8(A) and 8(B), a switch member 112 is further provided on an inner circumferential part of a base 110a, and four contact switches 194a are disposed apart from one another in the circumferential direction on an inner circumferential surface of the base 110a between the base 110a and the switch member 112 at the inner circumferential surface of the haptic feedback controller 100a. Four springs 196 are also disposed between the base 110a and the switch member 112.

In this way, in the haptic feedback controller 100a according to the second embodiment, the construction of the contact switches differs to that used in the haptic feedback controller 100 according to the first embodiment, but in the same way as the haptic feedback controller 100 according to the first embodiment, the piezoelectric motor 130 that can produce a large torque even during low-speed rotation is used as the driving source for haptic feedback, so that sufficiently large haptic feedback can be applied to a cap 120a (not shown) even during low-speed rotation of the cap 120a. In addition, since the base 110a and the cap 120a are respectively fixed to the stator 140 and the rotor 150 of the piezoelectric motor 130, there is no backlash.

For this reason, for the haptic feedback controller 100a according to the second embodiment, like the haptic feedback controller 100 according to the first embodiment, there is no loss in the ability to express haptic feedback. As a result, the haptic feedback controller 100a according to the second embodiment is a haptic feedback controller that can express a wide variety of haptic feedback.

Also, for the haptic feedback controller 100a according to the second embodiment, by clicking an appropriate position of the switch member 112 on the inner circumferential surface of the haptic feedback controller 100a with his or her finger, the user can switch on one contact switch out of the four contact switches 194a. By doing so, predetermined control information can be outputted to the PC 10 that is the controlled appliance. It is also possible to select one out of a plurality of predetermined operation modes of the haptic feedback controller 100a.

Third Embodiment

Figure 9:
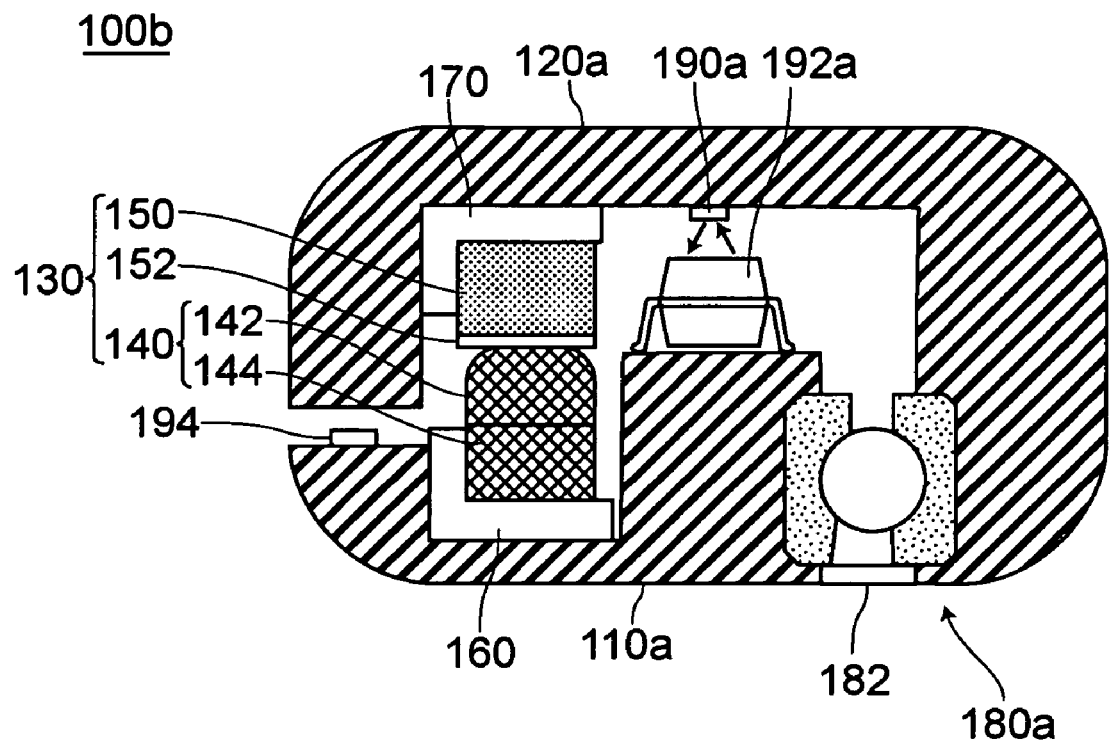
FIG. 9 is a partial expanded cross-sectional view useful in explaining a haptic feedback controller 100b according to a third embodiment.

FIG. 9 is a partial cross-sectional view useful in explaining a haptic feedback controller 100b according to a third embodiment.

The haptic feedback controller 100b according to the third embodiment fundamentally has the same construction as the haptic feedback controller 100 according to the first embodiment, but as shown in FIG. 9, the construction differs to the haptic feedback controller 100 according to the first embodiment in that a cap 120a composes an inner circumferential surface of the haptic feedback controller. In accordance with this, the position at which a ball bearing 180a is disposed and the positions at which an encoding barcode 190a and an optical sensor unit 192a are disposed also differ.

In this way, the haptic feedback controller 100b according to the third embodiment differs to the haptic feedback controller 100 according to the first embodiment in that the cap 120a composes the inner circumferential surface of the haptic feedback controller, but in the same way as the haptic feedback controller 100 according to the first embodiment, the piezoelectric motor 130 that produces a large torque even during low-speed rotation is used as the driving source for haptic feedback, so that sufficiently large haptic feedback can be applied to the cap 120a even during low-speed rotation of the cap 120a. In addition, the base 110a and the cap 120a are respectively fixed to the stator 140 and the rotor 150 of the piezoelectric motor 130, so there is no backlash.

For this reason, for the haptic feedback controller 100b according to the third embodiment, like the haptic feedback controller 100 according to the first embodiment, there is no loss in the ability to express haptic feedback. As a result, the haptic feedback controller 100b according to the third embodiment is a haptic feedback controller that can express a wide variety of haptic feedback.

Fourth Embodiment

Figure 10:
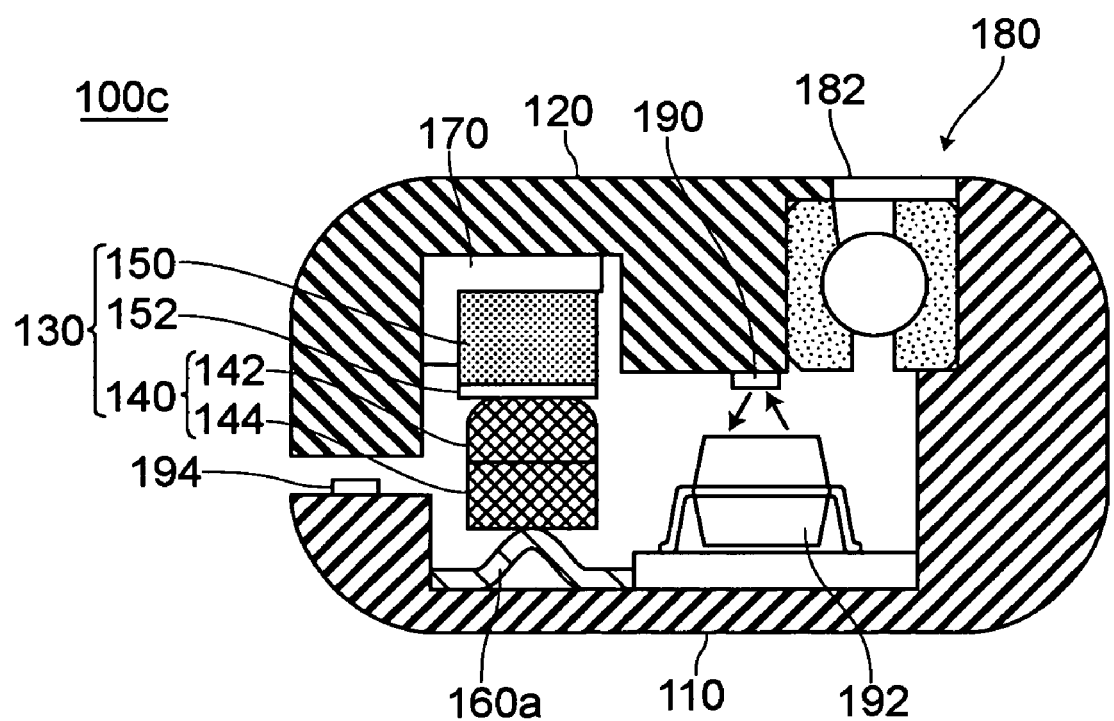
FIG. 10 is a partial expanded cross-sectional view useful in explaining a haptic feedback controller 100c according to a fourth embodiment.

FIG. 10 is a partial enlarged cross-sectional view useful in explaining a haptic feedback controller 100c according to a fourth embodiment.

The haptic feedback controller 100c according to the fourth embodiment fundamentally has the same construction as the haptic feedback controller 100 according to the first embodiment, but the construction of the shock absorbing member disposed between the base 110 and the stator 140 differs to that used in the haptic feedback controller 100 according to the first embodiment. That is, as shown in FIG. 10, in the haptic feedback controller 100c according to the fourth embodiment a ring-shaped plate spring 160a is used as the shock absorbing member disposed between the base 110 and the stator 140.

In this way, for the haptic feedback controller 100c according to the fourth embodiment, the construction of the shock absorbing member disposed between the base 110 and the stator 140 differs to the haptic feedback controller 100 according to the first embodiment, but in the same way as the haptic feedback controller 100 according to the first embodiment, the piezoelectric motor. 130 that produces a large torque even during low-speed rotation is used as the driving source for haptic feedback, so that sufficiently large haptic feedback can be applied to the cap 120 even during low-speed rotation of the cap 120. In addition, since the base 110 and the cap 120 are respectively fixed to the stator 140 and the rotor 150 of the piezoelectric motor 130, there is no backlash.

For this reason, for the haptic feedback controller 100c according to the fourth embodiment, like the haptic feedback controller 100 according to the first embodiment, there is no loss in the ability to express haptic feedback. As a result, the haptic feedback controller 100c according to the fourth embodiment is a haptic feedback controller that can express a wide variety of haptic feedback.

Fifth Embodiment

Figure 11:
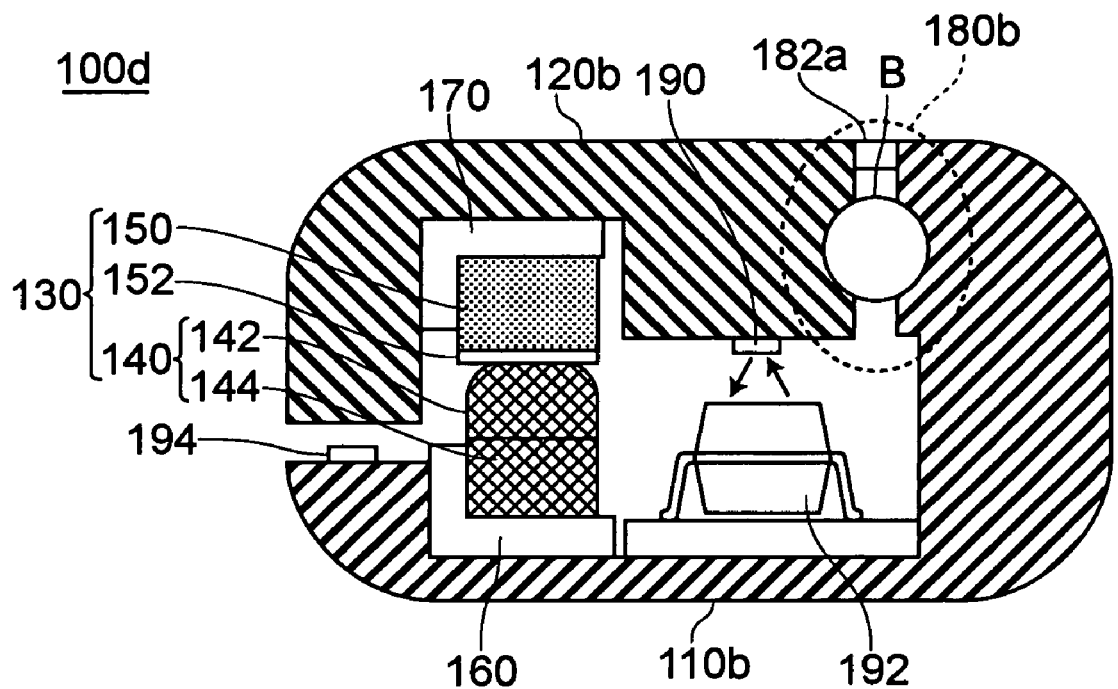
FIG. 11 is a partial expanded cross-sectional view useful in explaining a haptic feedback controller 100d according to a fifth embodiment.

FIG. 11 is a partial enlarged cross-sectional view useful in explaining a haptic feedback controller 100d according to a fifth embodiment.

The haptic feedback controller 100d according to the fifth embodiment fundamentally has the same construction as the haptic feedback controller 100 according to the first embodiment, but the construction of the bearing mechanism differs to that used in the haptic feedback controller 100 according to the first embodiment. That is, as shown in FIG. 11, the bearing mechanism in the haptic feedback controller 100d according to the fifth embodiment is a bearing mechanism 180b manufactured by fitting together a base 110b and a cap 120b to form a single body in a state where balls B have been inserted into respective concave parts. In accordance with this, the construction of a cover 182a also differs.

In this way, for the haptic feedback controller 100d according to the fifth embodiment, the construction of the bearing mechanism differs to that used in the haptic feedback controller 100 according to the first embodiment, but in the same way as the haptic feedback controller 100 according to the first embodiment, the piezoelectric motor 130 that produces large torque even during low-speed rotation is used as the driving source for haptic feedback, so that sufficiently large haptic feedback can be applied to the cap 120b even during low-speed rotation of the cap 120b. In addition, since the base 110b and the cap 120b are respectively fixed to the stator 140 and the rotor 150 of the piezoelectric motor 130, there is no backlash.

For this reason, for the haptic feedback controller 100d according to the fifth embodiment, like the haptic feedback controller 100 according to the first embodiment, there is no loss in the ability to express haptic feedback. As a result, the haptic feedback controller 100d according to the fifth embodiment is a haptic feedback controller that can express a wide variety of haptic feedback.

Sixth Embodiment

Figure 12:
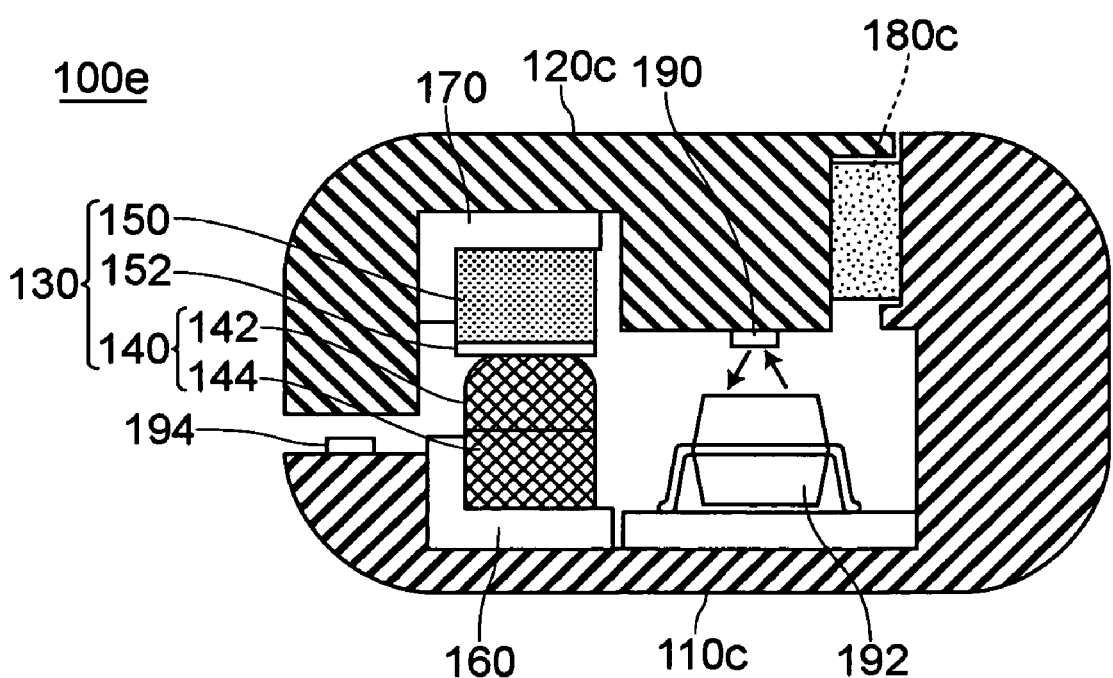
FIG. 12 is a partial expanded cross-sectional view useful in explaining a haptic feedback controller 100e according to a sixth embodiment.

FIG. 12 is a partial enlarged cross-sectional view useful in explaining a haptic feedback controller 100e according to a sixth embodiment.

The haptic feedback controller 100e according to the sixth embodiment fundamentally has the same construction as the haptic feedback controller 100 according to the first embodiment, but the construction of the bearing mechanism differs to that used in the haptic feedback controller 100 according to the first embodiment. That is, as shown in FIG. 12, the bearing mechanism in the haptic feedback controller 100e according to the sixth embodiment is a bearing mechanism 180c manufactured by fitting a cap 120c onto a base 110c to form a single body in a state where a sliding member has been disposed between the base 110c and the cap 120c.

In this way, for the haptic feedback controller 100e according to the sixth embodiment, the construction of the bearing mechanism differs to that used in the haptic feedback controller 100 according to the first embodiment, but in the same way as the haptic feedback controller 100 according to the first embodiment, a piezoelectric motor 130 that can produce a large torque even during low-speed rotation is used as the driving source for haptic feedback, so that sufficiently large haptic feedback can be applied to the cap 120c even during low-speed rotation of the cap 120c. In addition, since the base 110c and the cap 120c are respectively fixed to the stator 140 and the rotor 150 of the piezoelectric motor 130, there is no backlash.

For this reason, for the haptic feedback controller 100e according to the sixth embodiment, like the haptic feedback controller 100 according to the first embodiment, there is no loss in the ability to express haptic feedback. As a result, the haptic feedback controller 100e according to the sixth embodiment is a haptic feedback controller that can express a wide variety of haptic feedback.

Seventh Embodiment

Figure 13A:
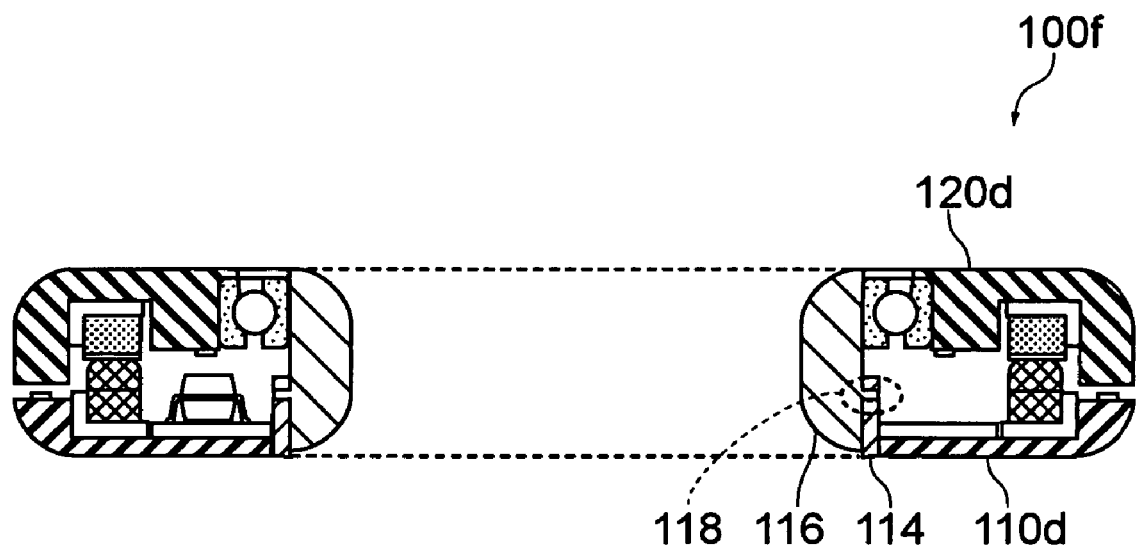
FIGS. 13A and 13B are series of diagrams useful in explaining a haptic feedback controller 100f according to a seventh embodiment.
Figure 13B:
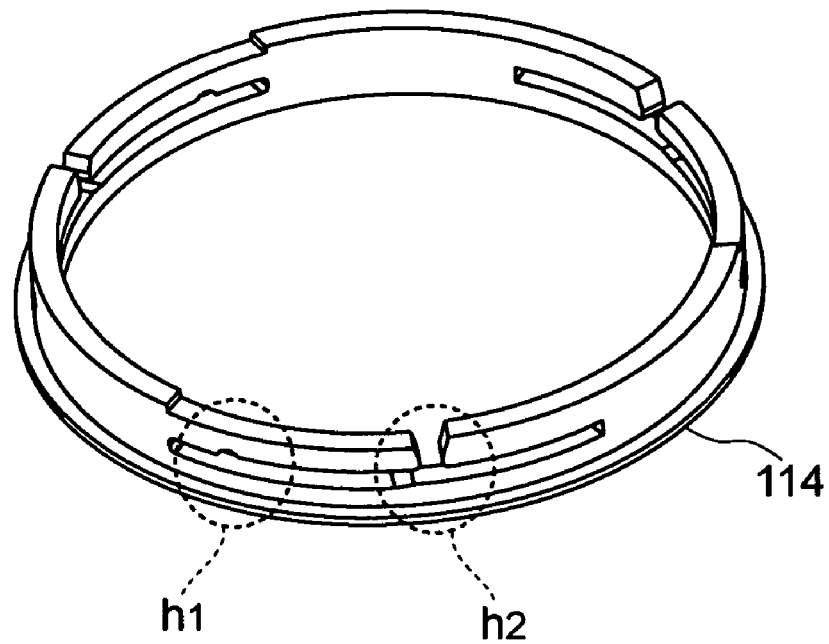

FIG. 13 is a series of diagrams useful in explaining a haptic feedback controller 100f according to a seventh embodiment. FIG. 13(A) is a cross-sectional view of the haptic feedback controller 100f and FIG. 13(B) is a perspective view of a cam mechanism 114.

The haptic feedback controller 100f according to the seventh embodiment fundamentally has the same construction as the haptic feedback controller 100 according to the first embodiment, but the construction differs to the haptic feedback controller 100 according to the first embodiment by including a mechanism that changes the distance between the base and the cap in the direction in which pressure is applied in steps. That is, as shown in FIGS. 13(A) and 13(B), the haptic feedback controller 100f according to the seventh embodiment has the cam mechanism 114 as the mechanism that changes the distance between a base 110d and a cap 120d in the direction in which pressure is applied in steps.

In this way, the haptic feedback controller 100f according to the seventh embodiment differs to the haptic feedback controller 100 according to the first embodiment by including the cam mechanism 114 that changes the distance between the base 110d and the cap 120d in the direction in which pressure is applied in steps, but in the same way as the haptic feedback controller 100 according to the first embodiment, a piezoelectric motor 130 that produces a large torque even during low-speed rotation is used as the driving source for haptic feedback, so that sufficiently large haptic feedback can be applied to the cap 120d even during low-speed rotation of the cap 120d. In addition, since the base 110d and the cap 120d are respectively fixed to the stator 140 and the rotor 150 of the piezoelectric motor 130, there is no backlash.

For this reason, for the haptic feedback controller 100f according to the seventh embodiment, like the haptic feedback controller 100 according to the first embodiment, there is no loss in the ability to express haptic feedback. As a result, the haptic feedback controller 100f according to the seventh embodiment is a haptic feedback controller that can express a wide variety of haptic feedback.

In addition, with the haptic feedback controller 100f according to the seventh embodiment, as described above, it is possible to change the pressure applied onto the stator 140 by the rotor 150 in steps, so that the torque and power consumption of the piezoelectric motor 130 can be changed in steps. For this reason, according to a setting made by the user, the haptic feedback controller 100f according to the seventh embodiment can be used as a haptic feedback controller that can express a wide variety of feedback or as a haptic feedback controller with low power consumption.

It should be noted that with the haptic feedback controller 100f according to the seventh embodiment, the distance between the base 110d and the cap 120d in the direction in which pressure is applied can be fixed at an hi position in FIG. 13(B) by inserting a pin 118 of a base inner circumferential member 116 into a channel in the cam mechanism 114 and rotating the base inner circumferential member 116 in this state clockwise with respect to the cam mechanism 114 or fixed at an h2 position in FIG. 13(B) by not rotating the base inner circumferential member 116.

Eight Embodiment

Figure 14:
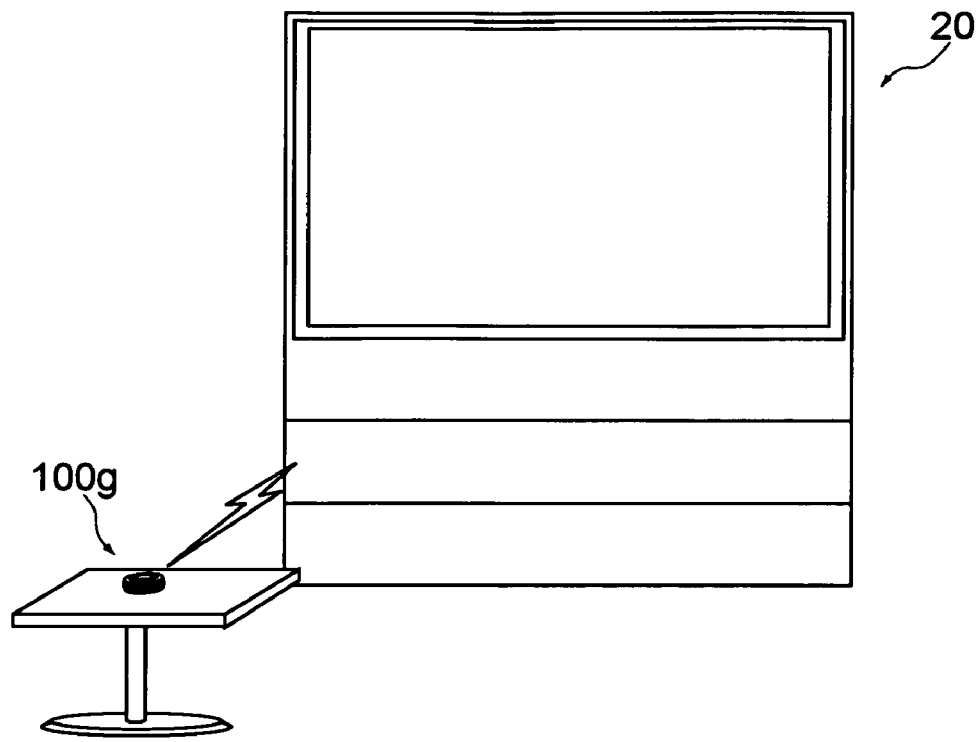
FIG. 14 is a diagram useful in explaining a remote controller 100g according to an eighth embodiment.

FIG. 14 is a diagram useful in explaining a remote controller 100g according to an eighth embodiment.

As shown in FIG. 14, the remote controller 100g according to the eighth embodiment is a haptic feedback controller for carrying out control (for example, channel selection, volume adjustment, and brightness adjustment) of a TV 20 as a controlled appliance.

The remote controller 100g according to the eighth embodiment fundamentally has the same construction as the haptic feedback controller 100 according to the first embodiment and therefore is a haptic feedback controller that can express a wide variety of haptic feedback. For this reason, by using the remote controller 100g according to the eighth embodiment, it is possible to more intuitively control the TV 20 (as examples, when adjusting the left-right volume balance for stereo sound, the resistance of the remote controller 100g can be increased at the center position so that the user can intuitively know that such position is the center position, and when the user rotates the cap to select a channel, a click sensation can be produced when switching channels and/or the rotational resistance can be reduced when passing channels that cannot be received), which improves the usability of the TV 20.

Also, in the remote controller 100g according to the eighth embodiment, an input/output device 230a (not shown) is an input/output interface that wirelessly exchanges information with the TV 20. For this reason, it is possible to remotely control the TV 20 which increases user convenience. It should be noted that in the remote controller 100g according to the eighth embodiment, Bluetooth is used as the input/output interface.

Aside from Bluetooth, ZigBee, NFC, and an infrared interface can be given as examples of an input/output interface for wirelessly exchanging information with the TV 20.

It should be noted that unlike the remote controller 100g according to the eighth embodiment, it is possible to use a haptic feedback controller according to the present invention on an operation panel surface of a conventional remote controller. In this case, the functionality of the remote controller can be made more complex.

Ninth Embodiment

Figure 15:
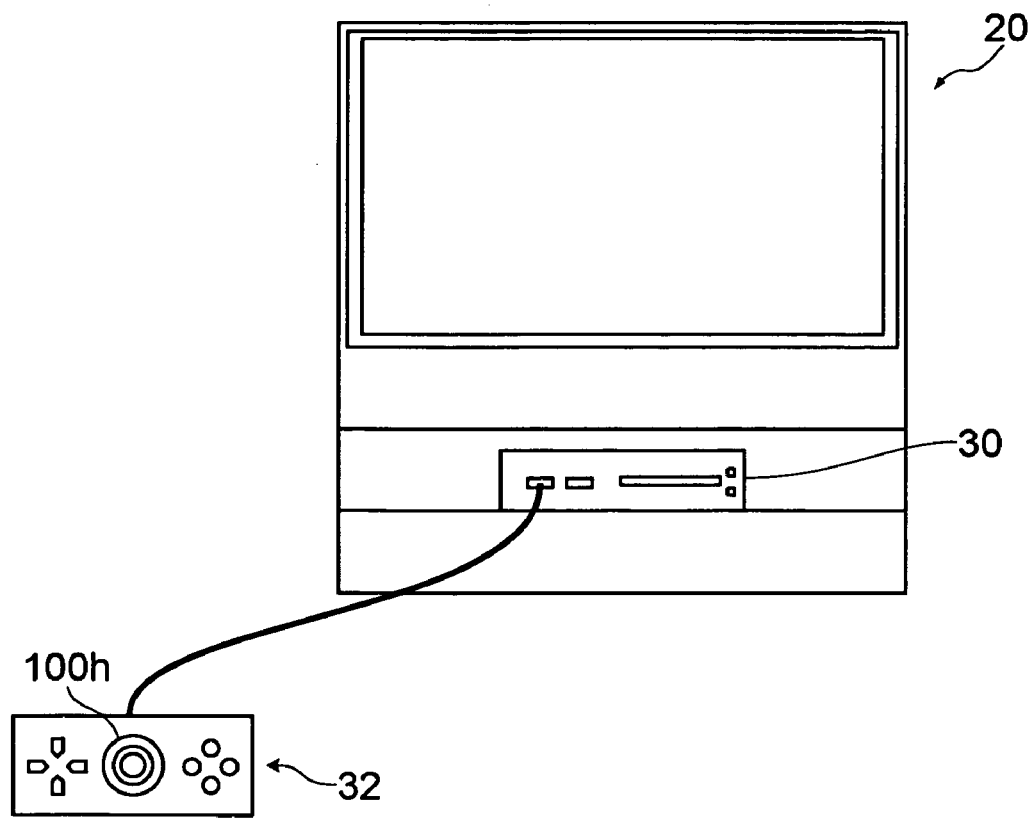
FIG. 15 is a diagram useful in explaining a game controller 32 according to a ninth embodiment.

FIG. 15 is a diagram useful in explaining a game controller 32 according to a ninth embodiment.

As shown in FIG. 15, the game controller 32 according to the ninth embodiment is a game controller for controlling a home video game system as the controlled appliance, and includes a haptic feedback controller 100h.

The game controller 32 according to the ninth embodiment includes the haptic feedback controller 100h with the same construction as the haptic feedback controller 100 according to the first embodiment on an operation panel. For this reason, by using the game controller 32 according to the ninth embodiment, it is possible to control the game system 30 more intuitively (as one example, when playing a role-playing game, on striking a wall the user receives feedback that simulates rebounding). It is also possible to receive a more realistic reaction from the game system 30 (as examples, during a shooting game, the haptic feedback controller 100h may vibrate when the user is hit and during a table tennis game, by allowing the user to feel the shot when returning the ball, it becomes possible to hit the ball in the desired direction), which makes games more realistic and exciting.

Tenth Embodiment

Figure 16:
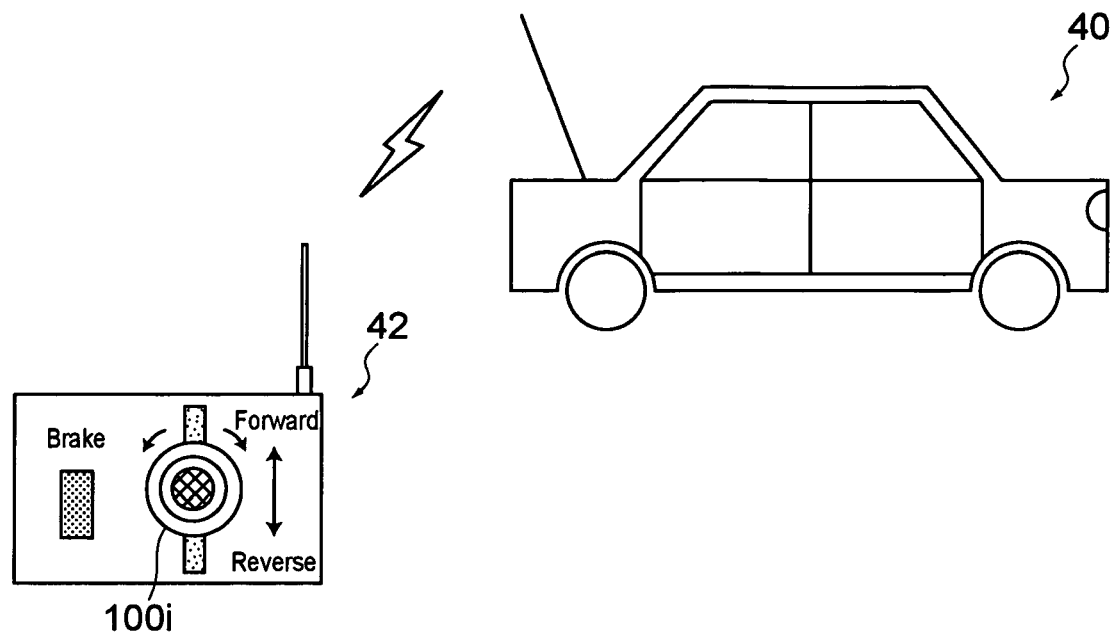
FIG. 16 is a diagram useful in explaining a remote controller 42 according to a tenth embodiment.

FIG. 16 is a diagram useful in explaining a remote controller 42 according to a tenth embodiment.

As shown in FIG. 16, the remote controller 42 according to the tenth embodiment is a remote controller for controlling a radio-controlled car 40 as the controlled appliance, and includes a haptic feedback controller 100i.

The remote controller 42 according to the tenth embodiment includes a haptic feedback controller 100i with the same construction as the haptic feedback controller 100 according to the first embodiment on an operation panel, so that by using the remote controller 42 according to the tenth embodiment, it is possible to intuitively control the radio-controlled car 40 (when the radio-controlled car moves from a paved road to a gravel road, the user immediately receives feedback simulating the steering wheel being jolted). It is also possible to provide realistic feedback in accordance with the environment in which the radio-controlled car 40 is located (for example, when one of the tires of the radio-controlled car 40 has fallen into a gutter, feedback that prevents the steering wheel from turning may be produced), which makes the radio-controlled car 40 more fun to play with.

Eleventh Embodiment

Figure 17:
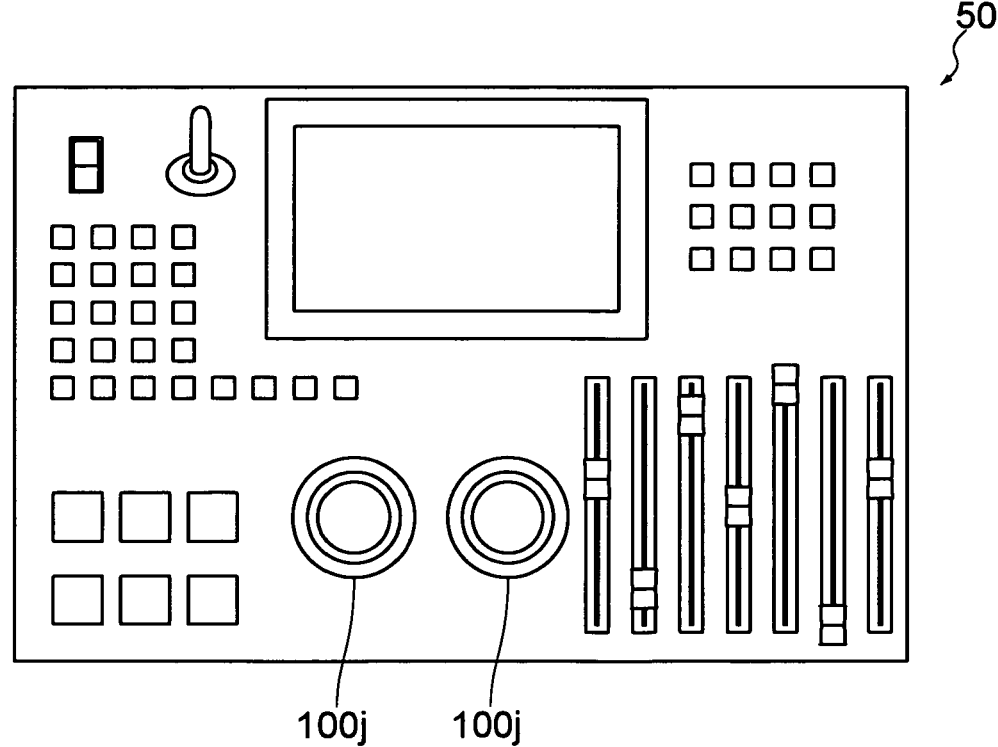
FIG. 17 is a diagram useful in explaining an image/audio editing appliance 50 according to an eleventh embodiment.

FIG. 17 is a diagram useful in explaining an image/audio editing appliance 50 according to an eleventh embodiment.

As shown in FIG. 17, the image/audio editing appliance 50 according to the eleventh embodiment is an image/audio editing appliance for controlling an audio appliance, an image appliance, or an audio/image recorder (not shown), and includes haptic feedback controllers 100j.

The image/audio editing appliance 50 according to the eleventh embodiment includes two haptic feedback controllers 100j that have the same construction as the haptic feedback controller 100 according to the first embodiment on an operation panel. Therefore, by using the image/audio editing appliance 50 according to the eleventh embodiment, it is possible to control an audio appliance, an image appliance, or an audio/image recorder more intuitively (for example, a fast forwarding of images can be carried out by rotating the haptic feedback controller 100j by a large angle and slow motion reproduction of images can be carried out by rotating the haptic feedback controller 100j by a small angle, with the feedback being produced so that the resistance increases as the images are forwarded faster). The haptic feedback controllers 100j can also be used as jog dials or shuttles of a jog shuttle, which makes the image/audio editing appliance more usable.

Twelfth Embodiment

Figure 18:
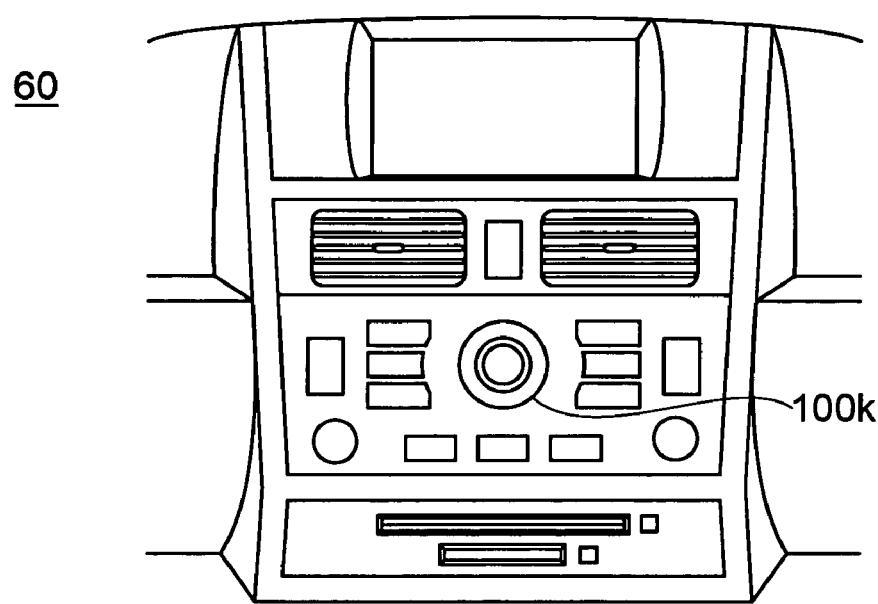
FIG. 18 is a diagram useful in explaining a car control panel 60 according to a twelfth embodiment.

FIG. 18 is a diagram useful in explaining a car control panel 60 according to a twelfth embodiment.

As shown in FIG. 18, the car control panel 60 according to the twelfth embodiment is a car control panel for controlling accessory equipment such as an air-conditioning system, an audio/video system, and a navigation system in a car (not shown) as the controlled appliances, and includes a haptic feedback controller 100k.

The car control panel 60 according to the twelfth embodiment includes the haptic feedback controller 100k, which has the same construction as the haptic feedback controller 100 according to the first embodiment, on a control panel. Therefore, by using the car control panel 60 according to the twelfth embodiment, the control panel can be operated more intuitively (for example, when adjusting the left-right volume balance for stereo sound, the resistance of the haptic feedback controller 100k can be increased at the center position so that the user can intuitively know that such position is the center position), so it is possible to make the control panel more user friendly. Also, since it is possible to provide the haptic feedback controller 100k with various kinds of functionality, it is possible to reduce the number of buttons and knobs, so that the interior of the car can be made simpler.

Thirteenth Embodiment

Figure 19:
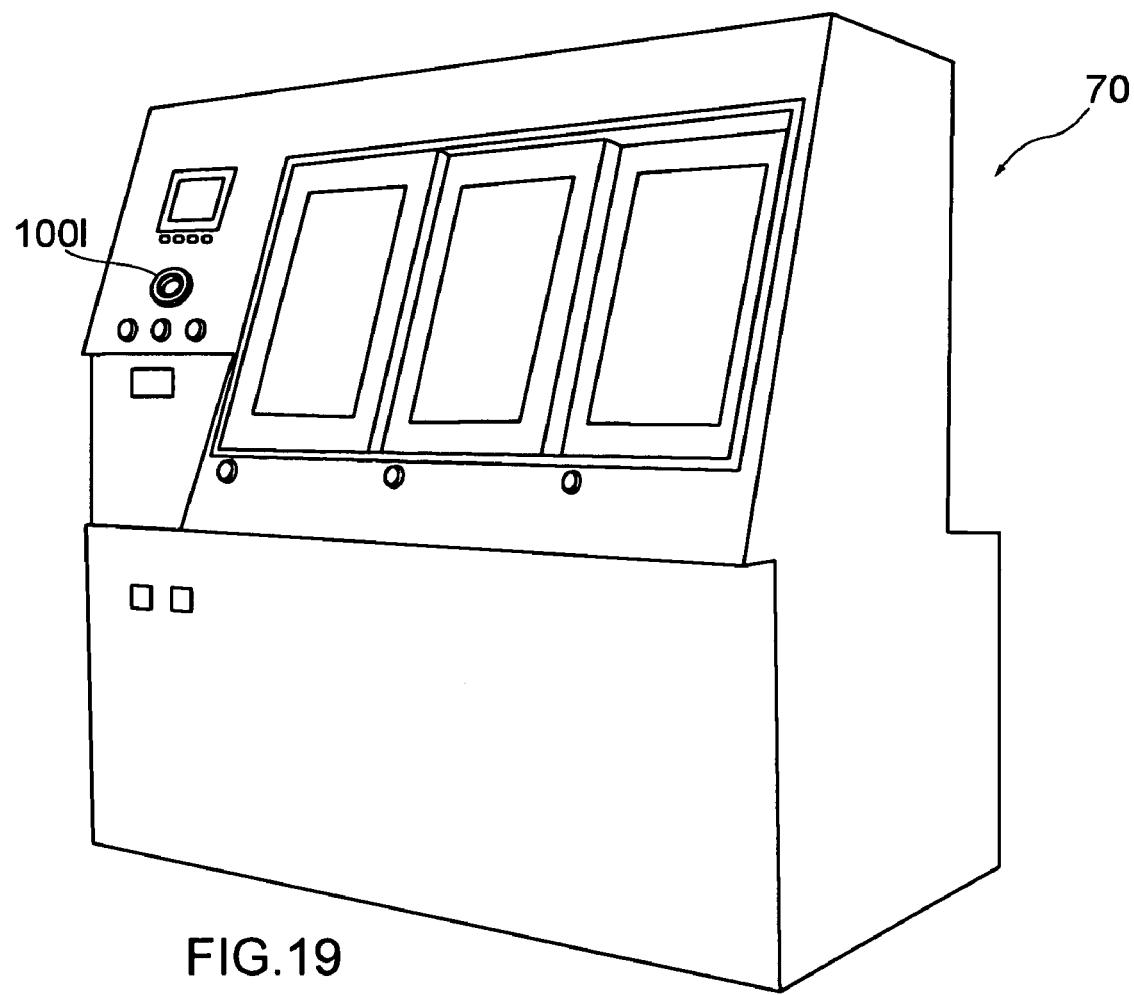
FIG. 19 is a diagram useful in explaining the haptic feedback controller 1001 according to a thirteenth embodiment.
Figure 20A:
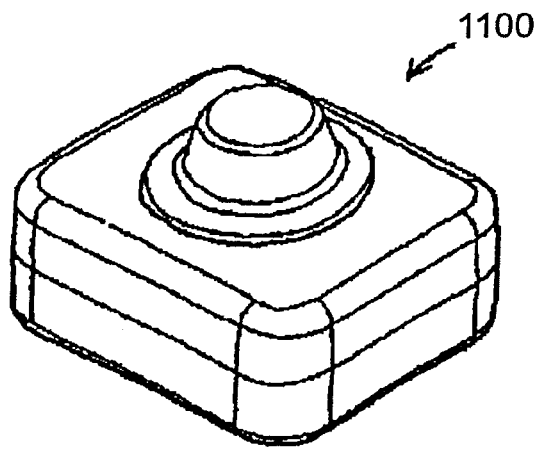
FIGS. 20A and 20B are series of diagrams useful in explaining a conventional haptic feedback controller 1100.
Figure 20B:
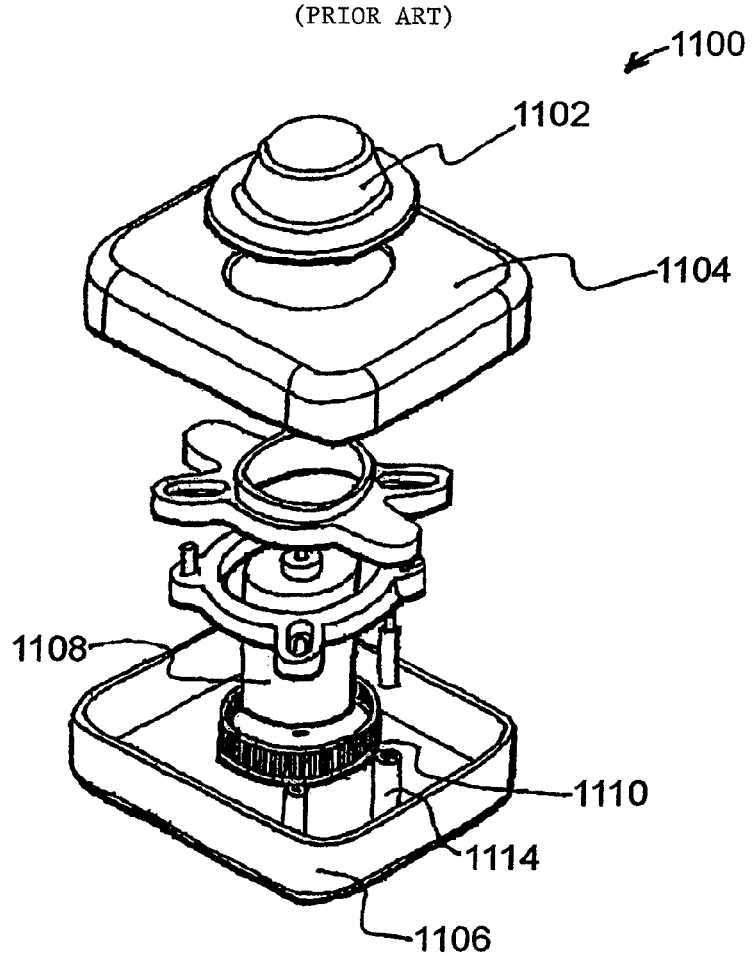
Figure 21:
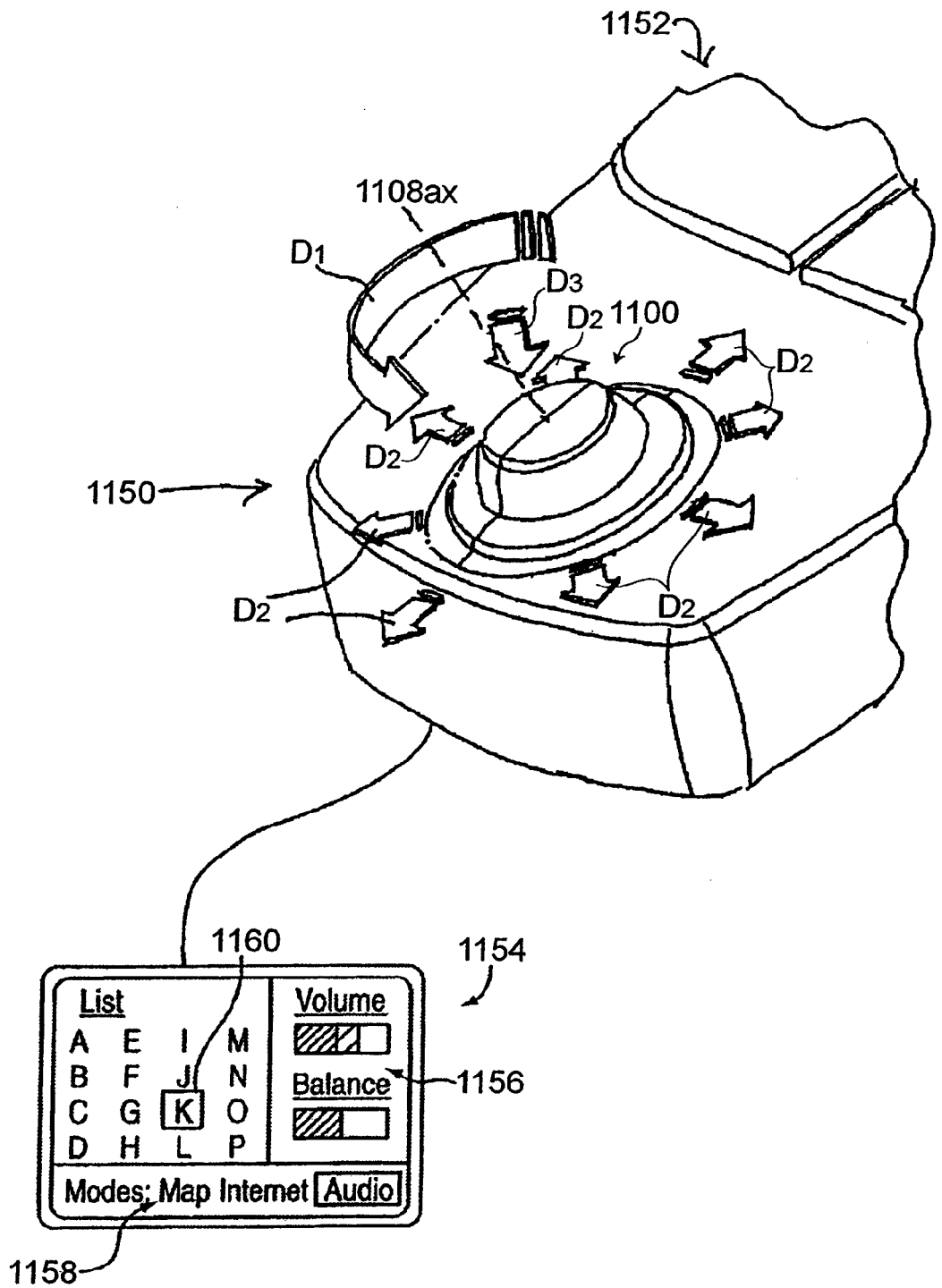
FIG. 21 is a diagram showing a control panel 1150 including the conventional haptic feedback controller 1100.
Figure 22:
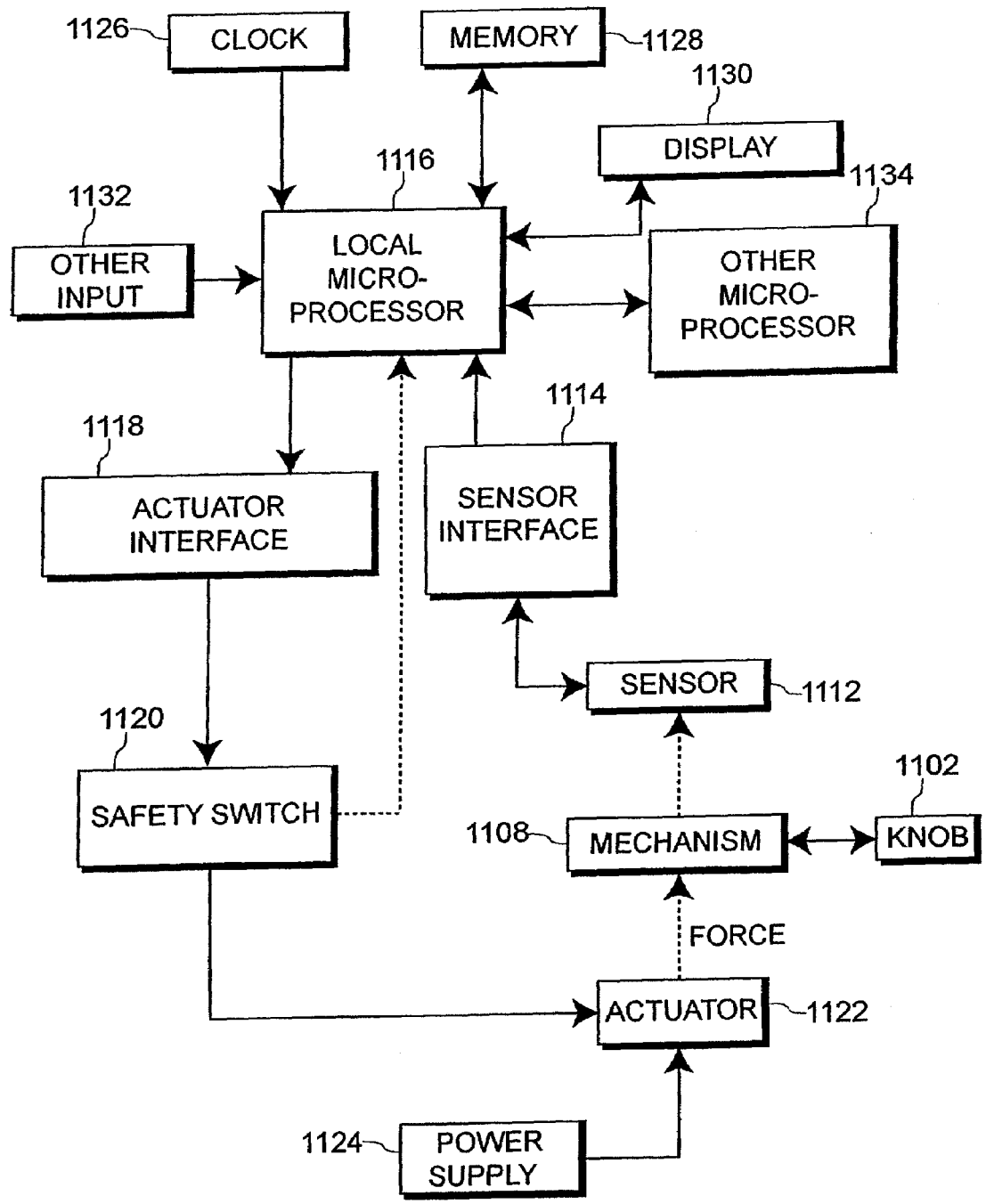
FIG. 22 is a block diagram showing the control panel 1150.
Figure 23A:
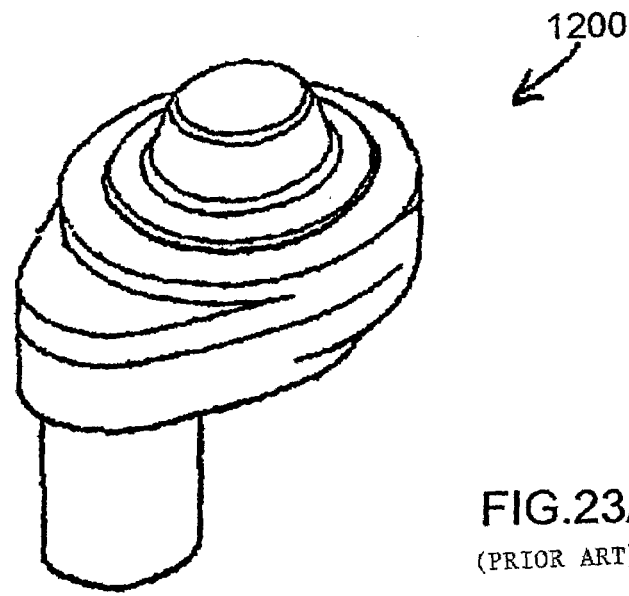
FIGS. 23A and 23B are series of diagrams useful in explaining another conventional haptic feedback controller 1200.
Figure 23B:
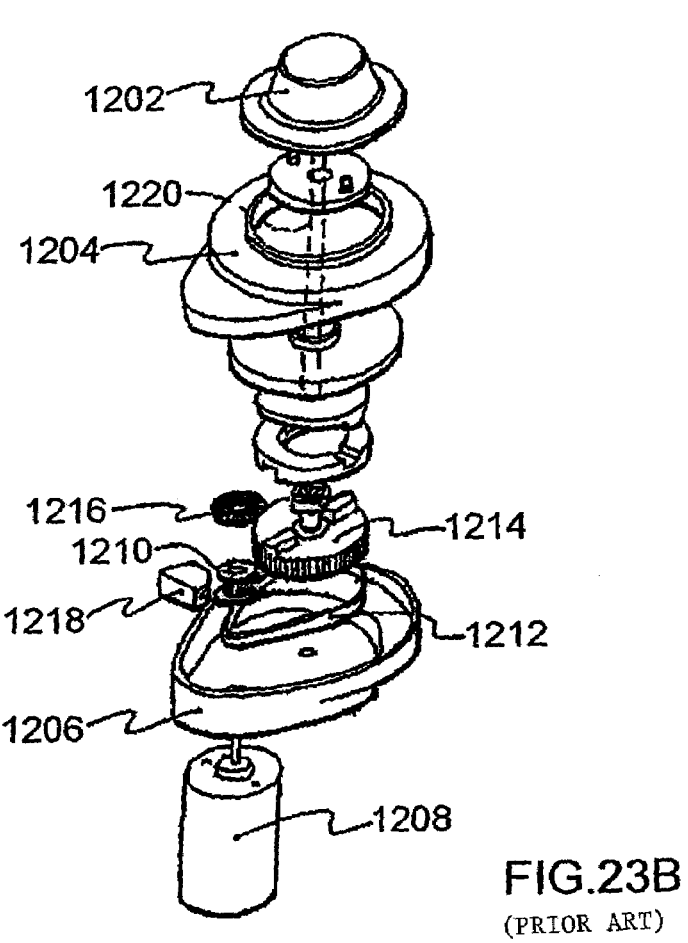

FIG. 19 is a diagram useful in explaining a haptic feedback controller 1001 according to a thirteenth embodiment.

As shown in FIG. 19, the haptic feedback controller 1001 according to the thirteenth embodiment is a haptic feedback controller for controlling a cutting apparatus 70 as the controlled appliance.

The haptic feedback controller 1001 according to the thirteenth embodiment fundamentally has the same construction as the haptic feedback controller 100 according to the first embodiment, and therefore is a haptic feedback controller that can express a wide variety of haptic feedback. For this reason, by using the haptic feedback controller 1001 according to the thirteenth embodiment as a knob on an operation panel, it becomes possible to operate the cutting apparatus 70 more intuitively (for example, no resistance may be produced when moving a work to the cutting position and the feedback may suddenly increase as the work approaches the cutting position), which improves the usability of the cutting apparatus. Also, since it is possible to determine the cutting conditions while feeling the stress received by the cutting blade, after such determination it is possible to always carry out cutting under optimal conditions, so that it is possible to improve the quality of cut products and to extend the lifespan of the cutting blade.

Fourteenth Embodiment

A controller (not shown) according to a fourteenth embodiment is a controller for controlling an endoscope as the controlled appliance, and includes a haptic feedback controller 100m (not shown).

The haptic feedback controller 100m according to the fourteenth embodiment has fundamentally the same construction as the haptic feedback controller 100 according to the first embodiment, and therefore by using the haptic feedback controller 100m according to the fourteenth embodiment as the knob that controls the feeding of the endoscope, it is possible to operate the controller more intuitively (for example, it is possible to produce feedback so that resistance is received in advance if the endoscope seems likely to strike the wall of an internal organ), which makes the endoscope easier to use.

Although the haptic feedback controller according to the present invention has been described based on the various embodiments above, the present invention is not limited to the above embodiments and can be modified in a variety of ways without departing from the scope of the invention. Examples of such modifications are described below.

(1) Although an example where the user operates the cap 120 is described in the first embodiment, the present invention is not limited to this. It is also possible to use the haptic feedback controller with the user operating the base, or with the user operating both the base and the cap with both hands, for example.

(2) Although an example has been described where the stator 140 is fixed to the base 110 and the rotor 150 is fixed to the cap 120 by fitting and fixing the components together using elastic force, the present invention is not limited to this. As one example, the respective parts can also be fixed by fastening in screws, applying adhesive, fixing with pins, or by pressing the cap onto the base in a state where the piezoelectric motor has been disposed between the base and the cap.

(3) Although a component with a function that outputs the rotational state information based on the detection result of the rotational state detecting device 220 is used as the input/output device 230 in the first embodiment, the present invention is not limited to this. A component that includes a function that outputs information aside from the rotational state information may be used as the input/output device. As one example, the information aside from the rotational state information may be information produced when a switch or button that may be provided on the haptic feedback controller has been pressed.

Also, although a component with a function for receiving an input of feedback information used for controlling the rotational state of the piezoelectric motor 130 is used as the input/output device 230 in the first embodiment, the present invention is not limited to this. A component with a function for receiving an input of information aside from the feedback information may be used as the input/output device. As examples, the information aside from the feedback information may be message information that the controlled appliance wishes to transmit to the user or information for controlling a light source that may be provided on the haptic feedback controller.

(4) Although a component that detects the rotational state of the cap 120 with respect to the base 110 by optically analyzing the movement of the encoding barcode 190 that rotates together with the cap 120 is used as the rotational state detecting device 220 in the first embodiment, the present invention is not limited to this. A component that detects the rotational state of the piezoelectric motor 130 by analyzing the current flowing through the piezoelectric motor 130 may also be used as the rotational state detecting device.

(5) Although the contact switches 194 that have a favorable click feel are used as the contact switches in the first embodiment, the present invention is not limited to this. It is also possible to use, as the contact switches, contact switches that have a poor click feel but give predetermined haptic feedback when the contact switches are turned on.

(6) Although the contact switches 194 that are provided on the outer circumferential part of the base 110 are used in the first embodiment, the present invention is not limited to this. The contact switches may be provided on an inner circumferential surface of the base 110.

(7) Although the haptic feedback controller 100 that does not have a light source is described in the first embodiment, the present invention is not limited to this. The haptic feedback controller maybe further equipped with a plurality of light sources disposed apart from one another in the circumferential direction. In this case, by controlling how the plurality of light sources flash, operation mode information for the haptic feedback controller itself, operation mode information for the controlled appliance and other valuable information can be provided to the user. It is also possible to improve the value of the haptic feedback controller as a design object. In this case, control over the plurality of light sources can be carried out based on information outputted to the controlled appliance, based on information from the controlled appliance, and/or based on other information.

(8) Although an example where the cam mechanism 114 is used as the mechanism for changing the distance between the base 110d and the cap 120d in the direction in which pressure is applied is described in the seventh embodiment, the present invention is not limited to this. It is also possible to use a screw mechanism or other mechanism as the mechanism for changing the distance between the base 110d and the cap 120d in the direction in which pressure is applied (9) Although the pressure applied by the rotor 150 onto the stator 140 is described as being changed in steps using the cam mechanism 114 in the seventh embodiment, the present invention is not limited to this. By having the user change the pressing force of the cap 120d on the base 110d, the pressure applied by the rotor 150 onto the stator 140 can also be changed directly. In this case, when the user presses with a large force, large haptic feedback is obtained, while when the user presses with a weak force, weak haptic feedback is obtained, so that it is possible to make the haptic feedback controller capable of expressing a wide range of haptic feedback and/or to reduce the power consumption of the haptic feedback controller.

(10) Although a method of transmitting messages relating to language information to the user using the haptic feedback controller 100 that uses the piezoelectric motor 130 as the driving force for applying haptic feedback is described in the first embodiment, the present invention is not limited to this. That is, by using a haptic feedback controller that uses a different type of motor to a piezoelectric motor as the driving force for applying haptic feedback, it is possible to transmit messages relating to language information to the user by emitting various types of sounds, producing various kinds of vibration, and/or by applying various kinds of resistance.

The invention claimed is:

1. A haptic feedback controller for controlling a controlled appliance, comprising:
    a base;
    a cap to be operated by a user of the haptic feedback controller, said cap being rotatable with respect to the base;
    a piezoelectric motor including a stator that is fixed to the base and a rotor that is fixed to the cap;
    a rotational state detecting device for detecting a rotational state of the cap with respect to the base, or a rotational state of the piezoelectric motor, caused by the user's operation of the cap; and
    a rotation control device for controlling, based on the detected rotational state, a rotation of the piezoelectric motor to provide haptic feedback to the user;
    wherein the rotor is pressed onto the stator with a pressing force that is changed directly by changing the force with which the user presses the cap onto the base so that strong haptic feedback is obtained when the cap is pressed by the user with a strong force and weak haptic feedback is obtained when the cap is pressed by the user with a weak force.

2. A haptic feedback controller according to claim 1, further comprising an input/output device for outputting rotational state information based on a detection result of the rotational state detecting device and receiving and input of feedback information used for controlling the rotational state of the piezoelectric motor.

3. A haptic feedback controller according to claim 2, wherein the input/output device includes an input/output power interface for obtaining a power supply from the controlled appliance.

4. A haptic feedback controller according to claim 2, wherein the input/output device includes an input/output wireless interface for wirelessly exchanging information with the controlled appliance.

5. A haptic feedback controller according to claim 1, further comprising a shock absorbing member between the base and the stator and/or between the cap and the rotor.

6. A haptic feedback controller according to claim 5, wherein said rotor includes a sliding member in sliding frictional contact with the stator.

7. A haptic feedback controller according to claim 1, further comprising a mechanism for changing a distance between the base and the cap in a direction in which pressure is applied to press the rotor on the stator.

8. A haptic feedback controller according to claim 1, further comprising a bearing mechanism for rotationally supporting the base on the cap.

9. A haptic feedback controller according to claim 1, wherein the rotational state detecting device includes an encoding barcode on an inner surface of the cap and a sensor unit fixed to an inner surface of the base, thereby detecting movement of the encoding barcode with respect to the sensor unit to detect rotational state of the cap with respect to the base.

10. A haptic feedback controller according to claim 1, wherein the rotational state detecting device detects the rotational state of the piezoelectric motor by analyzing a current flowing through the piezoelectric motor.

11. A haptic feedback controller according to claim 1, wherein the haptic feedback controller is ring-shaped with each of the cap, the rotor, the stator and the base being annular and extending around an empty space at a center of the ring-shaped haptic feedback controller.

12. A haptic feedback controller according to claim 11, wherein
    the base and the cap are disposed so as to face one another with a predetermined gap between the respective outer circumferential parts thereof, and
    said controller further comprises a plurality of contact switches disposed apart from one another in a circumferential direction on at least one of the outer circumferential parts.

13. A haptic feedback controller according to claim 11, further comprises a plurality of contact switches disposed apart from one another in a circumferential direction on an inner circumferential surface of the haptic feedback controller.

14. A haptic feedback controller according to claim 1, further comprising a non-slip member on a bottom surface of the base.

15. A haptic feedback controller according to claim 1, further comprising a control unit for controlling the piezoelectric motor, when the user has rotated the cap, to maintain the rotational state.

16. A haptic feedback controller according to claim 1, further comprising a control unit for controlling the piezoelectric motor, when the user has rotated the cap, so that the rotor moves in a direction away from the stator to reduce a pressure of the rotor on the stator.

17. A haptic feedback controller according to claim 1, further comprising a control unit for controlling the piezoelectric motor, when the user has caused a change in the rotational state of the cap, to maintain said changed rotational state.

18. A haptic feedback controller according to claim 1, further comprising a control unit for electronically controlling the piezoelectric motor in different operation modes to produce different kinds of sound and/or vibration and/or resistance to rotation of the cap.

19. A haptic feedback controller according to claim 1, further comprising a plurality of light sources disposed apart from one another in a circumferential direction of the controller.

20. A haptic feedback controller according to claim 1, wherein the rotation control device and the rotational state detecting device are entirely disposed in a space formed between the base and the cap.

21. A haptic feedback controller according to claim 1, wherein the stator of the piezoelectric motor is in direct physical contact with the rotor, without the intermediary of gears and/or belts, for driving the rotor to rotate to provide haptic feedback to the user.

22. A haptic feedback controller according to claim 1, wherein each of the stator and rotor defines a cavity, though which a rotational axis of the cap passes, and allows the cap to rotate with respect to the base; and the rotational state detecting device is disposed between the cap and the base for detecting the rotational state of the cap with respect to the base or the rotational state of the piezoelectric motor which rotates in a circumferential direction centered around the rotational axis.

23. A combination of the haptic feedback controller according to claim 1 and the controlled appliance, wherein the controlled appliance is one of a PC, a household electrical good, a game system, a toy, a content editing appliance, a means of transport, a machine tool, and a medical tool.

* * * * *